United States Patent
Xie et al.

(10) Patent No.: US 12,457,351 B2
(45) Date of Patent: Oct. 28, 2025

(54) VIDEO ENCODING METHOD AND APPARATUS, VIDEO DECODING METHOD AND APPARATUS, AND ELECTRONIC DEVICE AND STORAGE MEDIUM

(71) Applicant: ZTE Corporation, Shenzhen (CN)

(72) Inventors: Shaowei Xie, Shenzhen (CN); Zhao Wu, Shenzhen (CN); Ping Wu, Shenzhen (CN); Pinlong Cai, Shenzhen (CN); Ying Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 11 days.

(21) Appl. No.: 18/577,790

(22) PCT Filed: Jun. 29, 2022

(86) PCT No.: PCT/CN2022/102406
§ 371 (c)(1),
(2) Date: Jan. 9, 2024

(87) PCT Pub. No.: WO2023/005579
PCT Pub. Date: Feb. 2, 2023

(65) Prior Publication Data
US 2024/0380911 A1   Nov. 14, 2024

(30) Foreign Application Priority Data
Jul. 30, 2021  (CN) .......................... 202110875430.8

(51) Int. Cl.
*H04N 19/50* (2014.01)
*H04N 19/14* (2014.01)
(Continued)

(52) U.S. Cl.
CPC ............ *H04N 19/50* (2014.11); *H04N 19/14* (2014.11); *H04N 19/172* (2014.11); *H04N 19/174* (2014.11); *H04N 19/70* (2014.11)

(58) Field of Classification Search
CPC ...... H04N 19/50; H04N 19/14; H04N 19/172; H04N 19/174; H04N 19/70
See application file for complete search history.

(56) References Cited

U.S. PATENT DOCUMENTS 11,095,887 B2 * 8/2021 Kim .................... G06N 3/084
11,252,413 B2 * 2/2022 Zhao .................. H04N 19/463
(Continued)

FOREIGN PATENT DOCUMENTS

CN  103458240 A  * 12/2013  ........... H04N 19/172
CN  106358041 A     1/2017
(Continued)

OTHER PUBLICATIONS

Moon, Joo-Hee translation of CN 109417619 A Apr. 28, 2017 (Year: 2017).*
(Continued)

*Primary Examiner* — Zaihan Jiang
(74) *Attorney, Agent, or Firm* — Wolf, Greenfield & Sacks, P.C.

(57) ABSTRACT

Disclosed are a video coding method and apparatus, a video decoding method and apparatus, an electronic device and a storage medium. The video coding method may include: acquiring a video picture, wherein the video picture is at least one frame of picture of a video; and performing weighted predictive coding of the video picture to generate a picture code stream, wherein the weighted predictive coding uses at least one set of weighted prediction identification information and parameters.

17 Claims, 6 Drawing Sheets

(51) Int. Cl.
  *H04N 19/172* (2014.01)
  *H04N 19/174* (2014.01)
  *H04N 19/70* (2014.01)

(56) References Cited

U.S. PATENT DOCUMENTS

| | | | |
|---|---|---|---|
| 11,805,275 B2* | 10/2023 | Deng | H04N 19/59 |
| 11,825,090 B1* | 11/2023 | Said | G06N 3/0455 |
| 11,831,877 B2* | 11/2023 | Deng | H04N 19/132 |
| 11,943,444 B2* | 3/2024 | Deng | H04N 19/593 |
| 2019/0149836 A1 | 5/2019 | Moon et al. | |
| 2021/0112241 A1* | 4/2021 | Hou | H04N 19/132 |
| 2021/0120247 A1 | 4/2021 | Galpin et al. | |
| 2022/0124376 A1* | 4/2022 | Said | H04N 19/44 |
| 2022/0159281 A1* | 5/2022 | Bae | C12N 1/165 |
| 2022/0182643 A1* | 6/2022 | Bae | H04N 19/154 |
| 2022/0182676 A1* | 6/2022 | Goswami | H04N 19/176 |
| 2022/0198218 A1* | 6/2022 | Sampson | G06F 18/2431 |

FOREIGN PATENT DOCUMENTS

| | | | | |
|---|---|---|---|---|
| CN | 109417619 A | * | 3/2019 | H04N 19/117 |
| CN | 112261409 A | | 1/2021 | |
| EP | 2 302 933 A1 | | 3/2011 | |
| EP | 2 612 499 B1 | | 1/2016 | |
| JP | 2019-528634 A | | 10/2019 | |
| JP | 2021-520087 A | | 8/2021 | |
| JP | 2022-544844 A | | 10/2022 | |
| WO | WO 2013/057782 A1 | | 4/2013 | |
| WO | WO 2018/037919 A1 | | 3/2018 | |
| WO | WO 2019/209913 A1 | | 10/2019 | |
| WO | WO 2020/066307 A1 | | 4/2020 | |

OTHER PUBLICATIONS

Choi, Ji-Ho translation of CN 103458240 A May 28, 2013 (Year: 2013).*

International Search Report and Written Opinion for International Application No. PCT/CN2022/102406, mailed Sep. 22, 2022.

First Office Action and Search Report for Japanese Application No. 2023-578781, mailed Jan. 14, 2025.

Tanizawa et al., Improved weighted prediction parameter signaling. Joint Collaborative Team on Video Coding (JCT-VC) of ITU-T SG 16 WP 3 and ISO/IEC JTC 1/SC 29/WG 11. Jul. 11-20, 2012; JCTVC-J0222:16 pages.

Extended European Search Report for European Application No. 22848184.2, dated Jun. 12, 2025.

Bordes, Weighted Prediction. 5th Joint Collaborative Team on Video Coding of ISO/IEC JTC1/SC29/WG11 and ITU-T. Mar. 16-23, 2011;JCTVC-E041r2:p. 1-9.

Mao et al., CNN-based Bi-prediction Utilizing Spatial Information for Video Coding. IEEE International Symposium on Circuits and Systems (ISCAS), May 26, 2019;5 pages.

* cited by examiner

VIDEO ENCODING METHOD AND APPARATUS, VIDEO DECODING METHOD AND APPARATUS, AND ELECTRONIC DEVICE AND STORAGE MEDIUM

CROSS-REFERENCE TO RELATED APPLICATION

This application is a national stage filing under 35 U.S.C. § 371 of International Patent Application Serial No. PCT/CN2022/102406, filed Jun. 29, 2022, which claims priority to Chinese patent application No. 202110875430.8 filed on Jul. 30, 2021. The contents of these applications are incorporated herein by reference in their entirety.

TECHNICAL FIELD

The present disclosure relates to the field of picture processing technology, and more particularly, to a video coding method and apparatus, a video decoding method and apparatus, an electronic device and a storage medium.

BACKGROUND

With the rapid development of digital media technology, videos have become an important means of communication. Video-based social interaction, entertainment, and learning have gradually integrated into daily lives of the general public, and videos are becoming increasingly accessible for ordinary users and gaining deeper user engagement. In current common video formats, it is often seen that a fade-in or fade-out effect is added at the beginning or end of a thematic content segment. These gradual transitions provide viewers with a more natural and comfortable viewing experience.

In order to alleviate the strain on network bandwidth caused by data transmission, video coding and decoding technologies have become an important research in the field of multimedia. When performing video coding, the inter-frame prediction techniques can effectively eliminate time-domain data redundancy and greatly reduce the video transmission bit rate. However, when there are luminance change scenes in the video sequence, such as fade-in and fade-out, lens aperture modulation, global or local changes in lighting source, etc., it may be difficult to achieve the ideal data compression effect with the conventional inter-frame motion estimation and motion compensation. In practical coding scenarios, when encountering local content blocks with luminance changes, the decision made by optimization models often favors intra-frame predictive coding, leading to a significant decrease in video coding efficiency. Therefore, in order to improve the coding effect in content luminance change scenes, a weighted prediction technique can be used in video coding, where when a luminance change is detected, the coding side needs to determine the weight and offset of the luminance change of the current picture relative to the reference picture, and generate the corresponding weighted prediction frames by the luminance compensation operation.

Currently, the weighted prediction technique has been proposed in the H.264/AVC standard and there are two modes of weighted prediction in its application, which are explicit weighted prediction and implicit weighted prediction. For the implicit weighted prediction, the model parameters are all fixed, which means that the coding and decoding sides agree to use the same weighted prediction parameters, and there is no need to transmit the parameters by the coding side, which reduces the burden on the code stream transmission and improves the transmission efficiency. However, since the weighted prediction parameters are fixed in the implicit mode, when it is applied to inter-frame unidirectional prediction, the varying distance between the current frame and the reference frame will lead to unsatisfactory prediction effects with fixed weights. That is, the explicit mode applies to inter-frame unidirectional prediction and bi-directional prediction, while the implicit mode applies only to inter-frame bi-directional prediction. For the explicit mode, the coding side needs to determine the weighted prediction parameters and identify them in the data header information; and the decoding side needs to read the corresponding weighted prediction parameters from the code stream to decode the picture smoothly. The weighted prediction involves a total of three prediction parameters, which are weight, offset, and log weight denominator. Here, in order to avoid floating-point operations, the weight needs to be amplified on the coding side, i.e., a log weight denominator is introduced, while it needs to be reduced by a corresponding factor on the decoding side.

Taking the H.266/VVC standard as an example, a series of parameter information for weighted prediction can be included inside the picture header or slice header. It is worth noting that each luminance or chroma component of the reference picture has a separate weighted prediction parameter. When a complex luminance change scene appears in the video content, although different weighted prediction parameters can be configured for different slice regions within the picture, there are many limitations in the slice division manner due to the fact that the slice division at the time of coding affects the data transmission at the network abstraction layer, and so on, and thus it is difficult for the slice layer-adaptive weighted prediction technique to flexibly satisfy diversified luminance change situations. On the other hand, in the existing standardization techniques, each reference picture is equipped with only one set of weighted prediction parameters (i.e., a set of weight and offset that cooperate with each other) and, when the current entire picture has a complete and consistent form of luminance change, only the closest reference picture in the forward direction and its weighted prediction parameter need to be selected to achieve a very good prediction effect. However, in order to appropriately accommodate other forms of content luminance change scenes, when video inter-frame coding is performed, multiple different reference pictures can be selected following the existing standards and the weights and offsets adapted to the reference pictures can be artificially configured for the contents of different regions of the current picture, as shown in FIG. 1. Considering that the buffer on the decoding side can often store only a small amount of decoded reference pictures, especially for large-data volume media contents, such as ultra-high-definition videos, panoramic videos, and so on, the scheme shown in FIG. 1 can only be applied to part of the luminance change scenes in practical applications.

In conclusion, the video coding schemes in the existing video coding standardization technique have significant limitations in their feasibility and flexibility when they are used for coding complex graphic luminance change scenes in videos.

SUMMARY

The main objective of embodiments of the present disclosure is to propose a video coding method and apparatus, an electronic device, and a storage medium that are intended to realize flexible coding of video in complex graphic luminance change scenes, thus improving the video coding efficiency and reducing the influence of graphic luminance change on the coding efficiency.

An embodiment of the present disclosure provides a video coding method, where the method includes the steps of: acquiring a video picture, where the video picture is at least one frame of picture of a video; and performing weighted predictive coding of the video picture to generate a picture code stream, where the weighted predictive coding uses at least one set of weighted prediction identification information and parameters.

An embodiment of the present disclosure provides a video decoding method, where the method includes the steps of: acquiring a picture code stream and parsing weighted prediction identification information and parameters in the picture code stream; and decoding the picture code stream according to the weighted prediction identification information and parameters to generate a reconstructed picture.

A further embodiment of the present disclosure provides a video coding apparatus, where the apparatus includes the following modules: a picture acquisition module for acquiring a video picture, where the video picture is at least one frame of picture of a video; and a video coding module for performing weighted predictive coding of the video picture to generate a picture code stream, where the weighted predictive coding uses at least one set of weighted prediction identification information and parameters.

A further embodiment of the present disclosure provides a video decoding apparatus, where the apparatus includes the following modules: a code stream acquisition module for acquiring a picture code stream and parsing weighted prediction identification information and parameters in the picture code stream; and a picture reconstruction module for decoding the picture code stream according to the weighted prediction identification information and parameters to generate a reconstructed picture.

A further embodiment of the present disclosure provides an electronic device, where the electronic device includes: at least one processor; and a memory configured to store at least one program, where the at least one program, when executed by the at least one processor, causes the at least one processor to carry out any of the methods according to the embodiments of the present disclosure.

A further embodiment of the present disclosure provides a computer-readable storage medium storing a computer program which, when executed by a processor, causes the processor to carry out any of the methods according to the embodiments of the present disclosure.

In embodiments of the present disclosure, by acquiring a video picture, which is at least one frame of picture in a video, and performing weighted predictive coding on the video picture to generate a picture code stream, where the weighted predictive coding process uses at least one set of weighted prediction identification information and parameters, flexible coding of the video picture is realized, which can improve the video coding efficiency and reduce the influence of the luminance change of the video picture on the coding efficiency.

DETAILED DESCRIPTION

It should be understood that the particular embodiments described herein are only intended to explain the present disclosure, and are not intended to limit the present disclosure.

In the following description, suffixes such as "module", "component" and "unit" used to represent elements are only to facilitate the description of the present disclosure, and have no special meanings in themselves. Therefore, "module", "component" or "unit" can be used in a mixed way.

Figure 1:
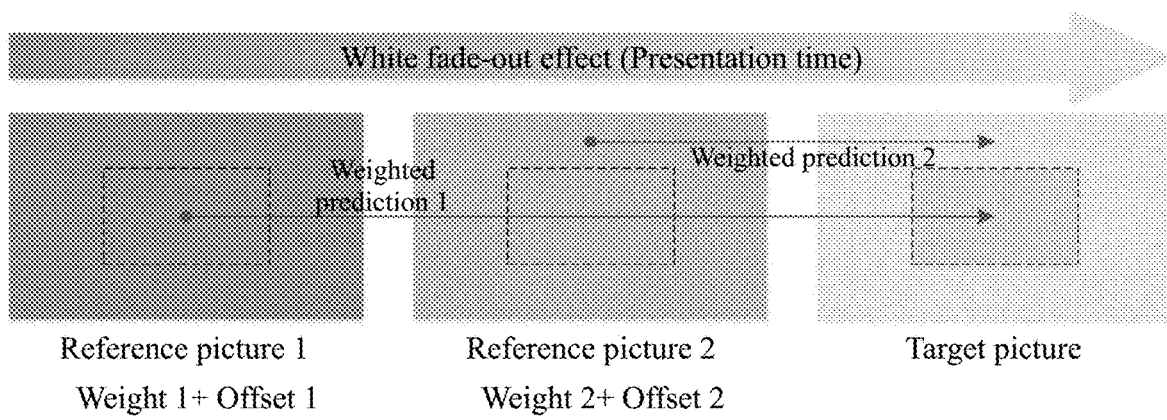
FIG. 1 is an example diagram of region-adaptive weighted prediction for multiple reference pictures in some technical schemes.
Figure 2:
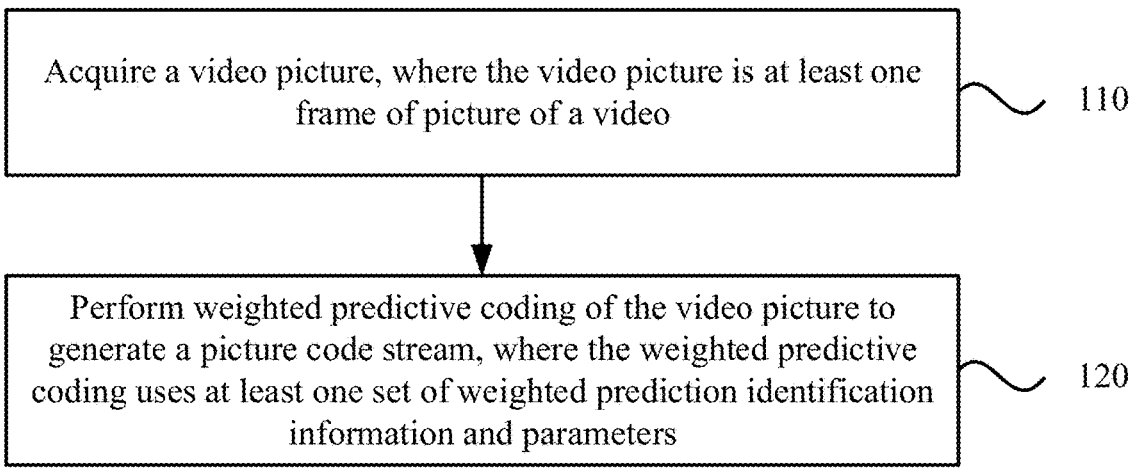
FIG. 2 is a flowchart of a video coding method according to an embodiment of the present disclosure.

FIG. 2 is a flowchart of a video coding method according to an embodiment of the present disclosure. Embodiments of the present disclosure may be applicable to video coding in luminance change scenes, and the method may be executed by a video coding apparatus, which may be implemented by software and/or hardware means and generally integrated in a terminal device. Referring to FIG. 2, the method according to embodiments of the present disclosure specifically includes the following steps:

At step 110, a video picture is acquired, where the video picture is at least one frame of picture of a video.

Here, the video picture may be video data that needs to be transmitted, and the video picture may be a certain frame of data in a video data sequence or a frame of data corresponding to a certain moment in time.

In the embodiment of the present disclosure, the video data may be processed to extract one or more frames of picture data from it as the video data to be subjected to video coding.

At step 120, weighted predictive coding of the video picture is performed to generate a picture code stream, where the weighted predictive coding uses at least one set of weighted prediction identification information and parameters;

Here, since there is a gradual change in light intensity over time in a scene in the video, or a shadow effect in a video of the same scene, although the similarity of the background between frames may possibly be high, the difference in the brightness and darkness is large, which results in luminance change in adjacent frames of picture, video coding may be performed on the current frame based on the preceding frame by means of the multiplication of a weight relative to the preceding frame as a whole, followed by the addition of an offset. This process of video coding by the weight and offset may be referred to as weighted predictive coding, where three main prediction parameters are involved in the weighted predictive coding process, which are weight, offset, and log weight denominator, where the log weight denominator can avoid floating-point operations in the coding process and amplify the weight. The weighted prediction identification information may be identification information for parameters used in the weighted prediction, where the parameters may be specific parameters of the weighted prediction identification information, and may include at least one of a weight, an offset, and a log weight denominator. The picture code stream may be data generated after coding of the video picture, and the picture code stream may be used for transmission between terminal devices.

In the embodiment of the present disclosure, the weighted predictive coding may be performed on the video picture, and one or more sets of weighted prediction identification information and parameters may be used in the process of the weighted predictive coding. For example, different weighted prediction identification information and parameters may be used for different frames of video picture, or different weighted prediction identification information and parameters may be used for different regions of the video picture within the same frame. It can be understood that, in the process of weighted predictive coding of the video picture, different weighted prediction identification information and parameters may be selected for video coding in accordance with luminance changes of the video picture.

In embodiments of the present disclosure, by acquiring a video picture, which is at least one frame of picture in a video, and performing weighted predictive coding on the video picture to generate a picture code stream, where the weighted predictive coding process uses at least one set of weighted prediction identification information and parameters, flexible coding of the video picture is realized, which can improve the video coding efficiency and reduce the influence of the luminance change of the video picture on the coding efficiency.

Figure 3:
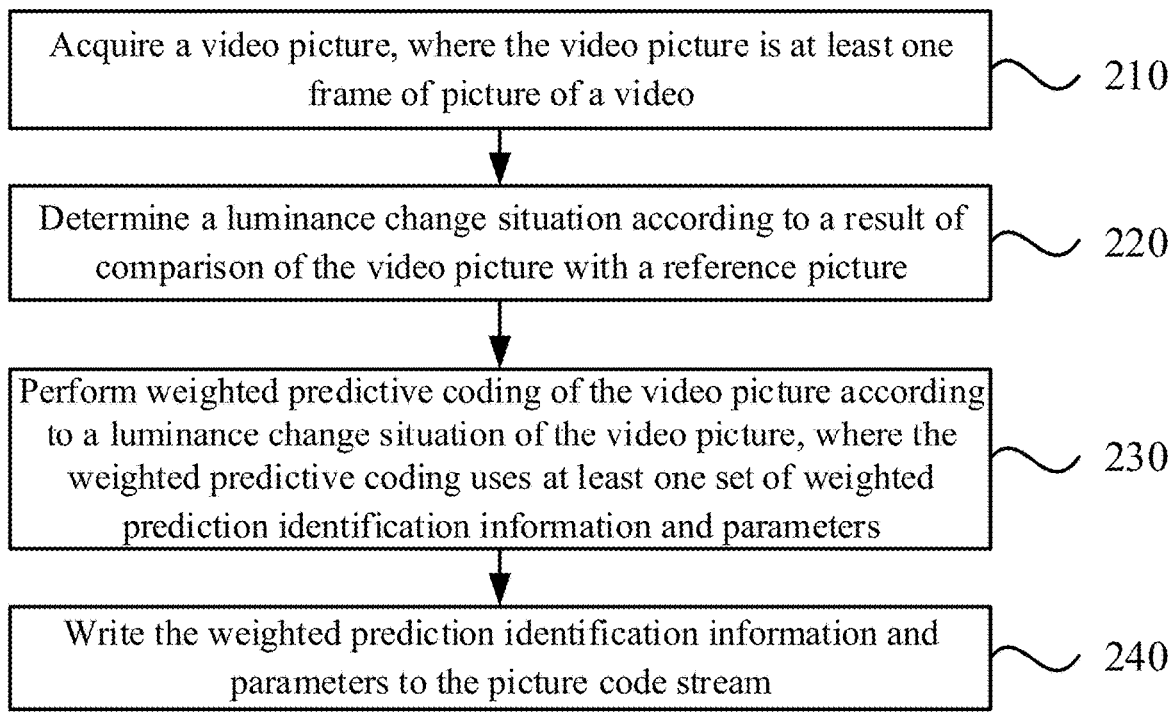
FIG. 3 is a flowchart of another video coding method according to an embodiment of the present disclosure.

FIG. 3 is a flowchart of another video coding method according to an embodiment of the present disclosure. Embodiments of the present disclosure are particularizations on the basis of the above embodiment of the present disclosure. Referring to FIG. 3, the method according to the embodiment of the present disclosure specifically includes the following steps:

At step 210, a video picture is acquired, where the video picture is at least one frame of picture of a video.

At step 220, a luminance change situation is determined according to a result of comparison of the video picture with a reference picture.

Here, the reference picture may be picture data in the video data sequence that is located before or after the video picture that is currently being processed, and the reference picture may be used for a motion estimation operation on the video picture that is currently being processed, and the number of reference pictures may be one or more frames. The luminance change situation may be a luminance change situation of the video picture relative to the reference picture, and the luminance change situation may specifically be determined by pixel value changes between the video picture and the reference picture.

In the embodiment of the present disclosure, the video picture may be compared with the reference picture, where the way of comparison may include calculating the difference of pixel values at corresponding positions, or calculating the difference of pixel mean values between the video picture and the reference picture, and so on, and the luminance change situation may be determined according to the result of the comparison of the video picture with the reference picture, where the luminance change situation may include gradually becoming brighter, gradually becoming darker, having no change, changing randomly, or the like.

Further, on the basis of the above embodiment of the present disclosure, the luminance change situation includes at least one of: a picture luminance change mean value, or a pixel point luminance change value.

Specifically, the luminance change situation of the video picture relative to the reference picture may be determined from the picture luminance change mean value and/or the pixel point luminance change value, where the picture luminance change mean value may refer to a mean value change of luminance value of the current picture relative to the reference picture, and the pixel point luminance change value may be a change in luminance value of each pixel point in the video picture relative to the luminance value of a pixel point at the corresponding position in the reference picture. It can be understood that the luminance change situation may also be a change in other luminance value statistical characteristics, such as, for example, a luminance variance, a luminance mean squared error, and the like.

At step 230, weighted predictive coding of the video picture is performed according to a luminance change situation of the video picture, where the weighted predictive coding uses at least one set of weighted prediction identification information and parameters.

In the embodiment of the present disclosure, multiple sets of weighted prediction identification information and parameters may be preset, and the corresponding prediction identification information and parameters may be selected according to the luminance change situation to perform weighted predictive coding of the video picture. It can be understood that weighted predictive coding can be performed on the video picture with respect to the specific content of the luminance change situation. For example, different weighted prediction identification information and parameters can be selected for weighted predictive coding with respect to luminance changes in different frames of the video picture, and different weighted prediction identification information and parameters can be selected for weighted predictive coding with respect to different regions in the video picture.

At step 240, the weighted prediction identification information and parameters are written to the picture code stream.

Specifically, the video picture is generated into a picture code stream after the weighted predictive coding, and the weighted prediction identification information and parameters used in the coding process may be written to the picture code stream for use in the video decoding process in the subsequent processes.

In embodiments of the present disclosure, by acquiring a video picture, determining a luminance change situation in accordance with the result of comparison between the video picture and the reference picture, performing weighted predictive coding on the video picture in accordance with the luminance change situation, and writing the weighted prediction identification information and parameters used in the weighted predictive coding into the picture code stream, flexible coding of the video picture is realized, which can improve the video coding efficiency and reduce the influence of the luminance change of the video picture on the coding efficiency.

Further, on the basis of the above embodiment of the present disclosure, said performing the weighted predictive coding of the video picture according to the luminance change situation includes at least one of:
- in the case where the luminance change situation is the luminance being consistent throughout the entire frame of picture, performing weighted predictive coding of the video picture; or
- in the case where the luminance change situation is the luminance being consistent within picture segments, determining to separately perform weighted predictive coding on each of the picture segments within the video picture.

Here, the luminance being consistent throughout the entire frame of picture may refer to that the video picture has the same luminance change throughout the entire frame of picture. The luminance being consistent within picture segments may refer to that there are multiple regions in the video picture, each of which has a different luminance change.

In the embodiment of the present disclosure, when the luminance change situation is the luminance being consistent throughout the entire frame of picture, the weighted predictive coding can be performed on the entire frame of video picture, and when the luminance change situation is the luminance being consistent within picture segments, the luminance change situation in the video picture is diversified, then weighted predictive coding may be performed on each picture region. It can be understood that when the luminance changes in the various picture regions are different, the weighted prediction identification information and parameters used in the weighted predictive coding process can be different.

Further, on the basis of the above embodiment of the present disclosure, the video picture has at least one set of said weighted prediction identification information and parameters present for the reference picture or picture segments of the reference picture.

In the embodiments of the present disclosure, the weighted prediction identification information and parameters used for the video picture in the weighted predictive coding process are information determined relative to the reference picture, and there exists one or more sets of weighted prediction identification information and parameters for the video picture with the reference picture as the baseline, where when there are multiple frames of reference picture for the video picture, the video picture may have one or more sets of weighted prediction identification information and parameters separately for each frame of reference picture, where each set of weighted prediction identification information and parameters may have an association with the corresponding video picture and/or reference picture.

Figure 4:
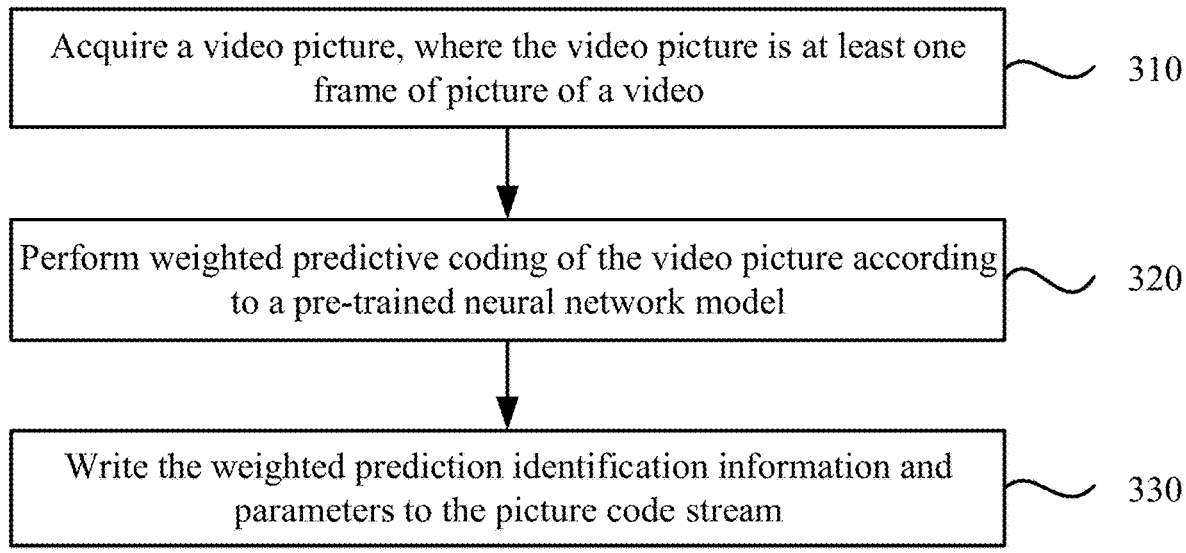
FIG. 4 is a flowchart of another video coding method according to an embodiment of the present disclosure.

FIG. 4 is a flowchart of another video coding method according to an embodiment of the present disclosure. Embodiments of the present disclosure are particularizations on the basis of the above embodiment of the present disclosure. Referring to FIG. 4, the method according to the embodiment of the present disclosure specifically includes the following steps:

At step 310, a video picture is acquired, where the video picture is at least one frame of picture of a video.

At step 320, weighted predictive coding of the video picture is performed according to a pre-trained neural network model.

Here, the neural network model can perform weighted predictive coding processing on the video picture and can determine the weighted prediction identification information and parameters used for the video picture, and the neural network model can be generated from training using picture samples identified with the weighted prediction identification information and parameters. The neural network model can determine the weighted prediction identification information and parameters of the video picture or directly determine the picture code stream of the video picture.

In the embodiment of the present disclosure, the video picture may be directly or indirectly inputted into the neural network model, and the weighted predictive coding of the video picture may be implemented by the neural network model. It can be understood that the input layer of the neural network model may accept the video picture or features of the video picture, and the neural network model may generate weighted prediction identification information and parameters for use in the weighted predictive coding of the video picture or, alternatively, directly perform the weighted predictive coding of the video picture.

At step 330, the weighted prediction identification information and parameters are written to the picture code stream.

In embodiments of the present disclosure, by acquiring a video picture, performing weighted predictive coding of the video picture using a pre-trained neural network model, and writing the weighted prediction identification information and parameters used in the weighted predictive coding into a picture code stream generated from the coding of the picture video, flexible coding of the video picture is realized, which can improve the video coding efficiency and reduce the influence of the luminance change of the video picture on the coding efficiency.

Further, on the basis of the above embodiment of the present disclosure, the weighted prediction identification information further includes a neural network model structure and a neural network model parameter.

Specifically, the weighted prediction identification information may further include a neural network model structure and a neural network model parameter, where the neural network model structure may be information reflecting the structure of the neural network, e.g., a function used in the fully-connected layer, an activation function, a loss function, and so on, and the neural network model parameter may be a specific value of the parameter of the neural network model, e.g., a network weight value, the number of hidden layers, and so on.

Further, on the basis of the above embodiment of the present disclosure, one set of said weighted prediction identification information and parameters used in the weighted predictive coding correspond to one frame of said video picture or at least one picture segment of the video picture.

In the embodiment of the present disclosure, one or more sets of weighted prediction identification information and parameters may be used in the weighted predictive coding process, and each set of weighted prediction identification information and parameters correspond to one frame of video picture or one picture segment in the video picture in the weighted predictive coding process, where this picture segment may be a portion of the video picture, e.g., a slice picture or a subpicture, or the like.

Further, on the basis of the above embodiment of the present disclosure, the specification of the picture segment includes at least one of: slice, tile, subpicture, coding tree unit, or coding unit.

Specifically, when weighted predictive coding is performed on the video picture in the form of a picture segment, the picture segment may be one or more of a slice, a tile, a subpicture, a coding tree unit, and a coding unit.

Further, on the basis of the above embodiment of the present disclosure, the weighted prediction identification information and the parameters are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

Specifically, the weighted prediction identification information and parameters may be written to the picture code stream, where the identification information and parameters are contained in all or some of the following parameter sets: a sequence layer parameter set, a picture layer parameter set, a slice layer parameter set, supplemental enhancement information, video availability information, picture header information, slice header information, network abstraction layer unit header information, or as a new information unit, they may also be contained in a coding tree unit, and a coding unit.

Further, on the basis of the above embodiment of the present disclosure, the weighted prediction identification information and the parameters include at least one of the following information: reference picture index information, weighted prediction enable control information, region-adaptive weighted prediction enable control information, or weighted prediction parameters.

In the embodiment of the present disclosure, the weighted prediction identification information may be reference picture index information, which is used to determine a reference picture used for the luminance change, weighted prediction enable control information, which is used to determine whether to perform weighted predictive coding, and region-adaptive weighted prediction enable control information, which is used to determine whether to perform regional weighted predictive coding on the picture video, and the weighted prediction parameters may be parameters used in the weighted predictive coding process, which may include a weight, an offset, a log weight denominator, and so on.

Further, on the basis of the above embodiment of the present disclosure, the picture code stream includes a transport stream or a media file.

Specifically, the picture code stream may be a transport stream or a media file.

Figure 5:
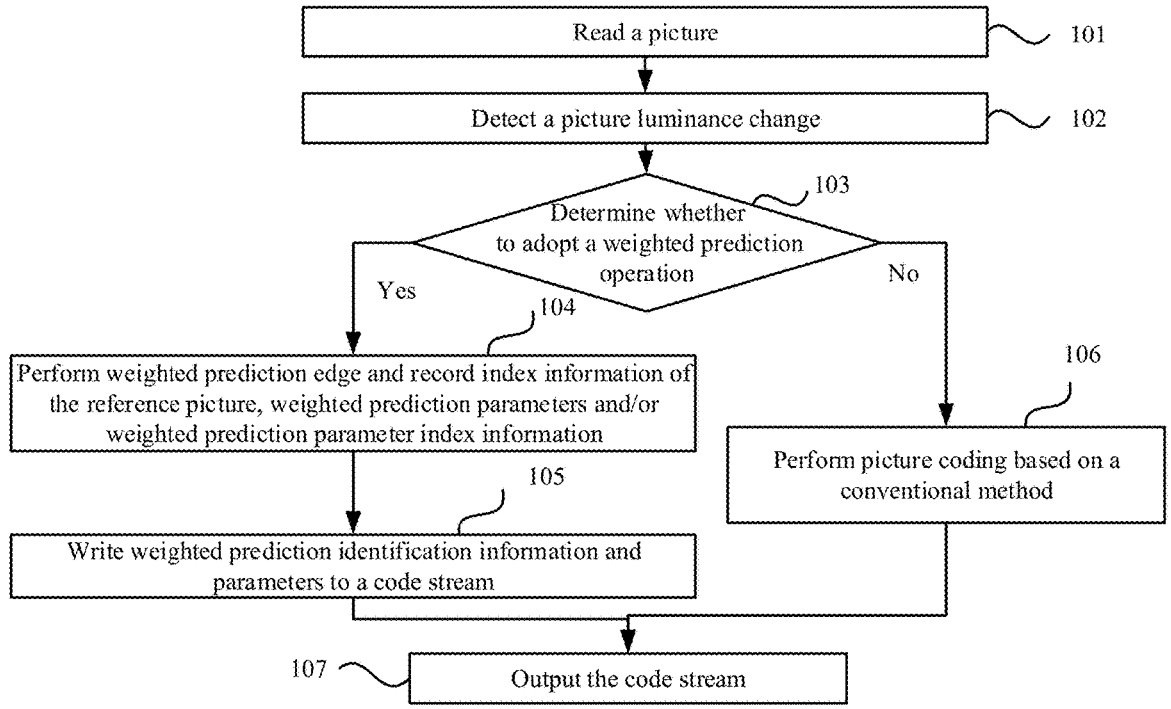
FIG. 5 is an example diagram of a video coding method according to an embodiment of the present disclosure.

In an implementation, FIG. 5 is an example diagram of a video coding method according to an embodiment of the present disclosure. Referring to FIG. 5, the input to the coding processing is a picture contained in a video, and the output is a picture code stream or a transport data stream or media file containing the picture code stream, and the process of video coding may include the following steps:

At step 101: a picture is read, where the picture may be a certain frame of data in a video sequence or a frame of data corresponding to a certain moment in time.

At step 102: a luminance change of this picture relative to a certain reference picture is detected.

Here, the reference picture may be a picture in the video sequence that is before the picture on the time line, or it may be a picture that is after the current picture on the time line, and the reference picture is used to perform a motion estimation operation on the current picture. The reference picture may have one frame or may have multiple frames;

the luminance change may refer to a mean value change in luminance value of the current picture relative to the reference picture, a change in the luminance value of each pixel point of the current picture relative to the luminance value of the pixel point at the corresponding position of the reference picture, or a change in some other luminance value statistical characteristics; and if there are multiple frames in the reference picture, the current picture needs to detect the luminance change for each frame of reference picture.

At step 103: according to the result of the luminance change detection in step 102, it is determined whether there is a need to adopt a weighted prediction operation. Here, the basis for the determination involves a trade-off for the weighted prediction operation between improved coding efficiency and increased coding complexity given a particular luminance change situation.

At step 104: when there is a need to adopt the weighted prediction operation, weighted predictive coding is performed, and index information of the aforementioned reference picture, one or more sets of weighted prediction parameters, and/or weighted prediction parameter index information are recorded.

According to the luminance change statistical information in step 102, the coder records the regional characteristics of the luminance change, where the regional characteristics of the luminance change include the luminance change being consistent throughout the region of the entire frame of picture, or the luminance change being consistent throughout a partial region of the picture. The partial region may be one or more slices, one or more tiles, one or more subpictures, one or more coding tree units (CTUs), one or more coding units (CUs);

if the luminance change is consistent throughout the region of the entire frame of picture, the luminance change of the reference picture corresponding to the current picture is considered to be uniform, otherwise it is not;

if the luminance change situation of the current picture is uniform, weighted predictive coding is performed and the index information of the aforementioned reference picture and the set of weighted prediction parameters are recorded, where the weighted prediction parameters include a weight and an offset; and if the luminance change situations of various regions of the current picture are diversified, weighted predictive coding is performed by picture region and the index information of the aforementioned reference picture and multiple sets of weighted prediction parameters as well as specific weighted prediction parameter index information used in each picture region are recorded. Here, it is possible that one picture region corresponds to one set of weighted prediction parameters, or a plurality of picture regions correspond to one set of weighted prediction parameters.

At step 105: the weighted prediction identification information and parameters are written to the code stream, where the identification information and parameters are contained in all or some of the following parameter sets: a sequence layer parameter set, a picture layer parameter set, a slice layer parameter set, supplemental enhancement information, video availability information, picture header information, slice header information, network abstraction layer unit header information, or as a new information unit, they may also be contained in a coding tree unit, and a coding unit.

At step 106: when there is no need to adopt the weighted prediction operation, picture coding is performed directly based on the conventional method.

At step 107: a picture code stream or a transport stream or media file containing the picture code stream is outputted.

Figure 6:
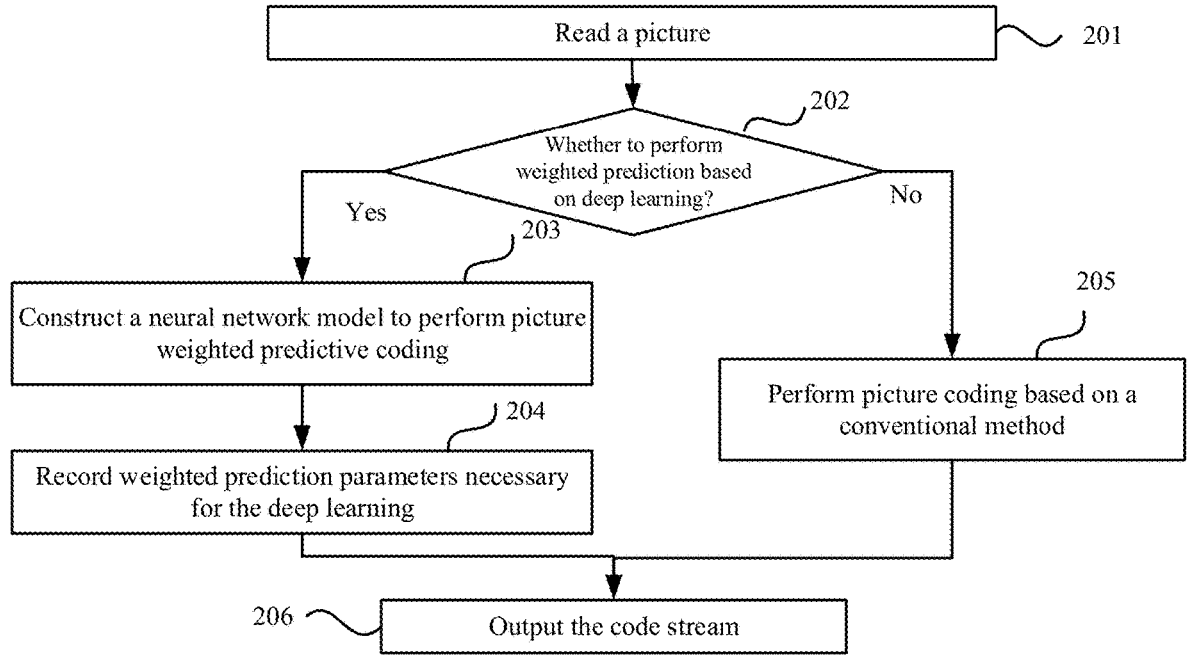
FIG. 6 is an example diagram of another video coding method according to an embodiment of the present disclosure.

In another implementation, FIG. 6 is an example diagram of a video coding method according to an embodiment of the present disclosure. Referring to FIG. 6, this embodiment applies the deep learning technique to the region-adaptive weighted prediction operation, and the process of video coding may include the following steps:

At step 201: a picture is read, where the picture may be a certain frame of data in a video sequence or a frame of data corresponding to a certain moment in time.

At step 202: it is determined whether to use a deep learning technique-based weighted prediction scheme.

At step 203: when a deep learning technique is used, the picture weighted predictive coding is performed using a neural network model and parameters generated through training.

In some embodiments, in order to reduce the computational complexity, they can be simplified to fixed weighted prediction parameters based on neural network learning and training. In applications, appropriate weighted prediction parameters are selected for weighted predictive coding for contents of different regions in the picture. The weighted prediction parameters may include a weight and an offset, where a single picture may use all or part of the weights and offsets in a set of values.

At step 204: when picture weighted predictive coding is performed based on the neural network model, the weighted prediction parameters necessary for the deep learning scheme are recorded, which include, but are not limited to, a neural network model structure and parameters, a set of weighted prediction parameter values extracted, and parameter index information used in each picture region.

At step 205: when no deep learning technique is used, region-adaptive weighted predictive coding is performed based on a conventional operational scheme, for example, based on the operation process in embodiment one.

At step 206: the weighted prediction identification information and parameters are written to the code stream, where the identification information and parameters are contained in all or some of the following parameter sets: a sequence layer parameter set, a picture layer parameter set, a slice layer parameter set, supplemental enhancement information, video availability information, picture header information, slice header information, network abstraction layer unit header information, or as a new information unit, they may also be contained in a coding tree unit, and a coding unit.

At step 207: a picture code stream or a transport stream or media file containing the picture code stream is outputted.

Figure 7:
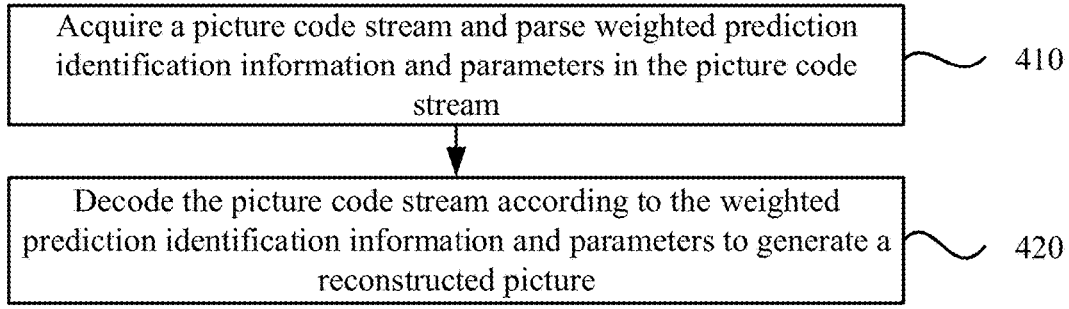
FIG. 7 is a flowchart of a video decoding method according to an embodiment of the present disclosure.

FIG. 7 is a flowchart of a video decoding method according to an embodiment of the present disclosure. Embodiments of the present disclosure may be applicable to video decoding in luminance change scenes, and the method may be executed by a video decoding apparatus, which may be realized by software and/or hardware means and generally integrated in a terminal device. Referring to FIG. 7, the method according to embodiments of the present disclosure specifically includes the following steps:

At step 410, a picture code stream is acquired and weighted prediction identification information and parameters in the picture code stream are parsed.

In the embodiment of the present disclosure, a transported picture code stream may be received and weighted prediction identification information and parameters may be extracted from the picture code stream, where the picture code stream may include one or more sets of weighted prediction identification information and parameters.

At step 420, the picture code stream is decoded according to the weighted prediction identification information and parameters to generate a reconstructed picture.

Specifically, the weighted predictive decoding of the picture code stream may be performed using the acquired weighted prediction identification information and parameters to process the picture code stream into a reconstructed picture, where the reconstructed picture may be a picture generated according to the transport code stream.

In embodiments of the present disclosure, by acquiring a picture code stream and acquiring weighted prediction identification information and parameters in the picture code stream, and processing the picture code stream in accordance with the acquired weighted prediction identification information and parameters to generate a reconstructed picture, the dynamic decoding of the picture code stream is realized, which can improve the video decoding efficiency and reduce the influence of luminance changes of the picture on the video decoding efficiency.

Figure 8:
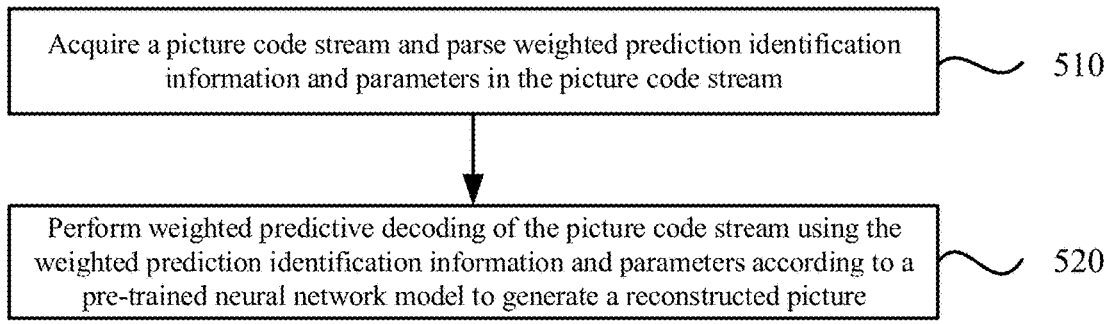
FIG. 8 is a flowchart of another video decoding method according to an embodiment of the present disclosure.

FIG. 8 is a flowchart of another video decoding method according to an embodiment of the present disclosure. Embodiments of the present disclosure are particularizations on the basis of the above embodiment of the present disclosure. Referring to FIG. 8, the method according to the embodiment of the present disclosure specifically includes the following steps:

At step 510, a picture code stream is acquired and weighted prediction identification information and parameters in the picture code stream are parsed.

At step 520, weighted predictive decoding of the picture code stream is performed using the weighted prediction identification information and parameters according to a pre-trained neural network model to generate a reconstructed picture.

Here, the neural network model may be a deep learning model for decoding the picture code stream, this deep network model may be generated through training of sample code streams and sample pictures, and the neural network model may perform weighted predictive decoding of the picture code stream.

In the embodiment of the present disclosure, the picture code stream and the weighted prediction identification information and parameters may be inputted to the pre-trained neural network model, and the neural network model may perform the weighted predictive decoding processing on the picture code stream to process the picture code stream into a reconstructed picture.

In embodiments of the present disclosure, by acquiring a picture code stream and acquiring weighted prediction identification information and parameters in the picture code stream, and processing the picture code stream into a reconstructed picture based on the weighted prediction identification information and parameters using a pre-trained neural network model, the dynamic decoding of the picture code stream is realized, which can improve the video decoding efficiency and reduce the influence of luminance changes of the picture on the video decoding efficiency.

Further, on the basis of the above embodiment of the present disclosure, the number of the weighted prediction identification information and parameters in the picture code stream is at least one set.

Specifically, the picture code stream may be information generated through weighted predictive coding of the video picture, and based on different ways of performing the weighted predictive coding, one or more sets of weighted prediction identification information and parameters may exist in the picture code stream. For example, if the coding side performs weighted predictive coding of different regions in the video picture separately, multiple sets of weighted prediction identification information and parameters may exist in the picture code stream.

Further, on the basis of the above embodiment of the present disclosure, the weighted prediction identification information and the parameters are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

Further, on the basis of the above embodiment of the present disclosure, the weighted prediction identification information and the parameters include at least one of the following information: reference picture index information, weighted prediction enable control information, region-adaptive weighted prediction enable control information, or weighted prediction parameters.

Further, on the basis of the above embodiment of the present disclosure, the picture code stream includes a transport stream or a media file.

Further, on the basis of the above embodiment of the present disclosure, the weighted prediction identification information and parameters further include a neural network model structure and a neural network model parameter.

Figure 9:
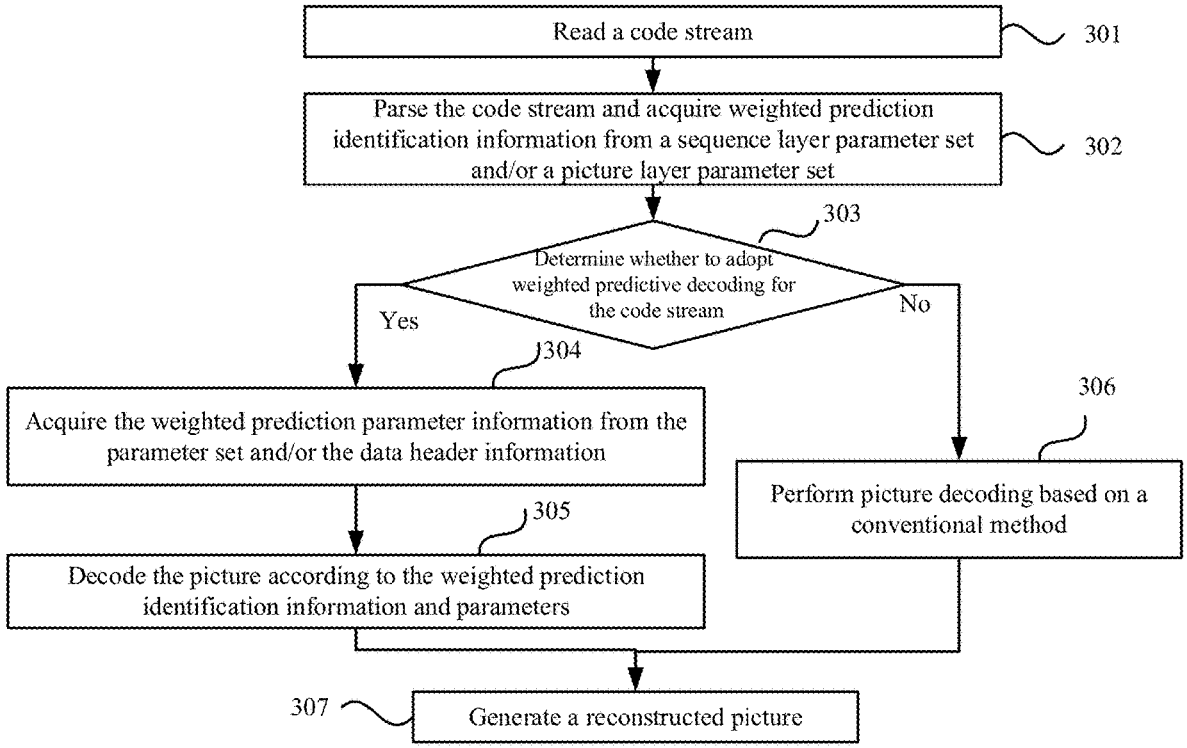
FIG. 9 is an example diagram of a video decoding method according to an embodiment of the present disclosure.

In an implementation, FIG. 9 is an example diagram of a video decoding method according to an embodiment of the present disclosure. Referring to FIG. 9, the input to the decoding processing is a picture code stream or a transport data stream or media file including the picture code stream, and the output is pictures constituting the video, and the decoding process of the video pictures may include:

At step 301: a code stream is read.

At step 302: the code stream is parsed to acquire weighted prediction identification information.

The decoder parses a sequence layer parameter set, a picture layer parameter set, and/or a slice layer parameter set to acquire the weighted prediction identification information. Here, the sequence layer parameter set includes a sequence parameter set (SPS), the picture layer parameter set includes a picture parameter set (PPS) and an adaptation parameter set (APS), and the slice layer parameter set includes an APS. The weighted prediction identification information in the sequence layer parameter set may be referenced by the picture layer parameter set and the slice layer parameter set, and the weighted prediction identification information in the picture layer parameter set may be referenced by the slice layer parameter set. The weighted prediction identification information includes, but is not limited to, whether to adopt unidirectional weighted prediction, bi-directional weighted prediction, and/or region-adaptive multi-weight weighted prediction for the sequence and/or picture indicated by the current parameter set, where the approach for distinguishing whether to adopt region-adaptive multi-weight weighted prediction includes, but is not limited to, parsing a binary identifier, or the number of sets of weighted prediction parameters (whether or not it is equal to or greater than 1).

At step 303: based on the weighted prediction identification information, it is determined whether to adopt weighted predictive decoding for the current picture.

At step 304: when determining to adopt weighted predictive decoding for the current picture, weighted prediction parameter information is acquired.

The decoder acquires the weighted prediction parameter information from the parameter set and/or the data header information as indicated by the identification information. Here, the parameter set includes an SPS, a PPS, and an APS, and the data header information includes a picture header (PH), and a slice header (SH). The weighted prediction parameter information includes, but is not limited to, whether each reference picture in a reference picture list is configured with weighted prediction parameters (a weight and an offset), the number of sets of weighted prediction parameter configured for each reference picture, and the specific values of each set of weighted prediction parameters.

At step 305: weighted predictive decoding is performed on the current picture based on the weighted prediction identification information and parameters.

Based on the weighted prediction identification information, the decoder may perform weighted predictive decoding of the current complete picture in a uniform form or perform differentiated weighted predictive decoding of various local contents in the picture.

At step 306: when determining not to adopt weighted predictive decoding for the current picture, picture decoding is performed directly based on the conventional method.

At step 307: a reconstructed picture is generated. Here, the reconstructed picture may be used for display or may be saved directly.

Figure 10:
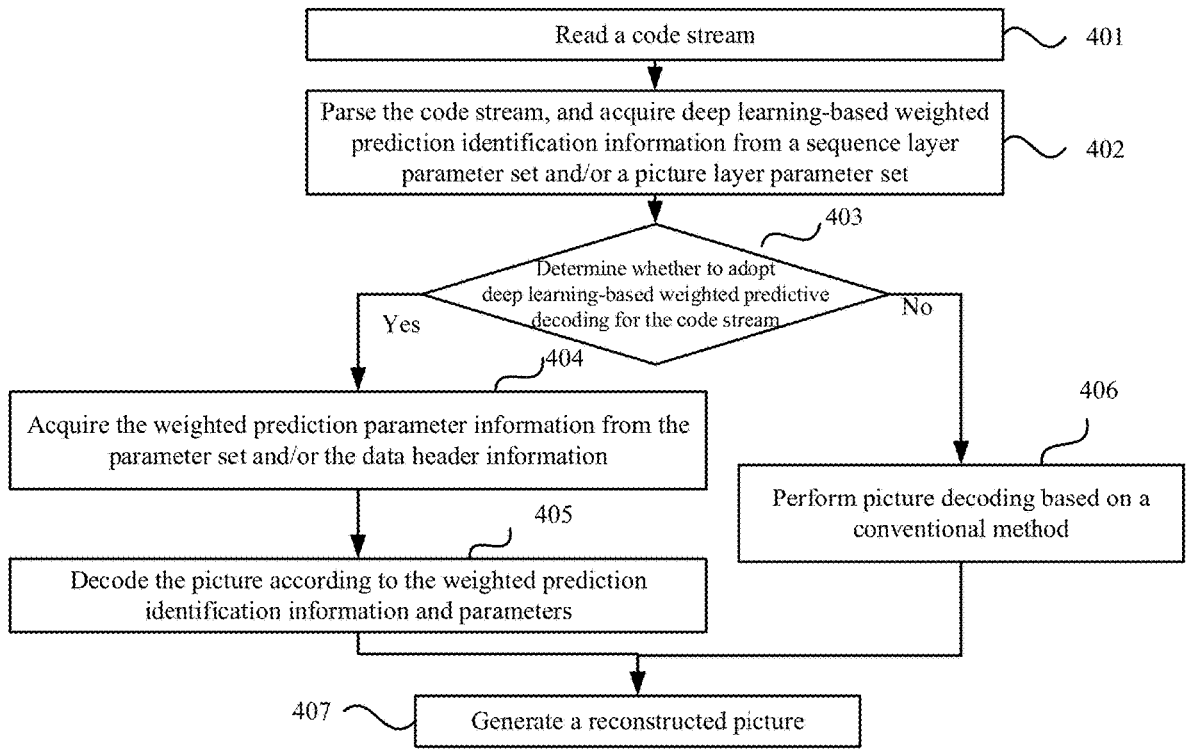
FIG. 10 is an example diagram of another video decoding method according to an embodiment of the present disclosure.

In another implementation, FIG. 10 is an example diagram of another video decoding method according to an embodiment of the present disclosure. Referring to FIG. 10, this embodiment applies the deep learning technique to the region-adaptive weighted prediction operation, and the video decoding method specifically includes the following steps:

At step 401: a code stream is read.

At step 402: the code stream is parsed to acquire identification information for deep learning-based weighted prediction.

The decoder parses a sequence layer parameter set, a picture layer parameter set, and/or a slice layer parameter set to acquire the identification information for deep learning-based weighted prediction. Among them, the sequence layer parameter set includes a sequence parameter set (SPS), the picture layer parameter set includes a picture parameter set (PPS) and an adaptation parameter set (APS), and the slice layer parameter set includes an APS. The weighted prediction identification information in the sequence layer parameter set may be referenced by the picture layer parameter set and the slice layer parameter set, and the weighted prediction identification information in the picture layer parameter set may be referenced by the slice layer parameter set. The identification information for deep learning-based weighted prediction includes, but is not limited to, whether to adopt deep learning-based weighted prediction for the sequence and/or the picture indicated by the current parameter set.

At step 403: based on the identification information for deep learning-based weighted prediction, it is determined whether to adopt deep learning-based weighted predictive decoding for the current picture.

At step 404: when determining to adopt the deep learning-based weighted predictive decoding for the current picture, weighted prediction parameters necessary for the deep learning scheme are acquired.

The decoder acquires the weighted prediction parameter information from the parameter set and/or the data header information as indicated by the identification information. Among them, the parameter set includes an SPS, a PPS, and an APS, and the data header information includes a picture header (PH), and a slice header (SH). The weighted prediction parameter information includes, but is not limited to, reference picture index information, a neural network model structure and parameters, all or part of the weighted prediction parameter values, and weighted prediction parameter index information used by regional contents of the current picture.

At step 405: based on the weighted prediction identification information and parameters, deep learning-based weighted predictive decoding is performed on the current picture.

At step 406: when determining not to adopt deep learning-based weighted predictive decoding for the current picture, picture decoding is performed directly based on the conventional method.

At step 407: a reconstructed picture is generated. Here, the reconstructed picture may be used for display or may be saved directly.

In an implementation, the embodiment gives identification information for the region-adaptive weighted prediction parameters contained in the sequence layer parameter set (SPS) in the code stream. The identification information in the SPS may be referenced by the PPS and the APS. The syntax and semantics in Table 1 are defined as follows:

sps_weighted_pred_flag is the enable control information for the sequence layer to apply the weighted prediction technique to unidirectional predictive slices (P slices). When sps_weighted_pred_flag is equal to 1, it indicates that weighted prediction may be possibly applied to the P slices indicated by this SPS; and conversely, when sps_weighted_pred_flag is equal to 0, it indicates that weighted prediction is not applied to the P slices indicated by this SPS.

sps_weighted_bipred_flag is the enable control information for the sequence layer to apply the weighted prediction technique to bi-directional predictive slices (B slices). When sps_weighted_bipred_flag is equal to 1, it indicates that explicit weighted prediction may possibly be applied to the B slices indicated by this SPS; and conversely, when sps_weighted_pred_flag is equal to 0, it indicates that explicit weighted prediction is not applied to the B slices indicated by this SPS.

sps_wp_multi_weights_flag is the enable control information for the sequence layer, which relates to the fact that a single reference picture has multiple sets of weighted prediction parameters. When sps_wp_multi_weights_flag is equal to 1, it indicates that a single reference picture of the picture indicated by this SPS may have multiple sets of weighted prediction parameters; and conversely, when sps_wp_multi_weights_flag is equal to 0, it indicates that a single reference picture of a picture indicated by this SPS has only a single set of weighted prediction parameters.

TABLE 1

|  | Descriptor |
|---|---|
| seq_parameter_set_rbsp( ) { | |
| ...... | |
| sps_weighted_pred_flag | u(1) |
| sps_weighted_bipred_flag | u(1) |
| if (sps_weighted_pred_flag \|\| sps_weighted_bipred_flag) | |
| sps_wp_multi_weights_flag | u(1) |
| ...... | |
| } | |

In an implementation, this embodiment gives identification information for the region-adaptive weighted prediction parameters contained in the picture layer parameter set (PPS) in the code stream, and the identification information in the PPS may be referenced by the APS.

The syntax and semantics in Table 2 are defined as follows:

pps_weighted_pred_flag is the enable control information for the picture layer to apply the weighted prediction technique to unidirectional predictive slices (P slices). When pps_weighted_pred_flag is equal to 1, it indicates that weighted prediction is applied to the P slices indicated by this PPS; and conversely, when pps_weighted_pred_flag is equal to 0, it indicates that weighted prediction is not applied to the P slices indicated by this PPS. When sps_weighted_pred_flag is equal to 0, the value of pps_weighted_pred_flag should be equal to 0.

pps_weighted_bipred_flag is the enable control information for the picture layer to apply the weighted prediction technique to bi-directional predictive slices (B slices). When pps_weighted_bipred_flag is equal to 1, it indicates that explicit weighted prediction is applied to the B slices indicated by this PPS; and conversely, when pps_weighted_pred_flag is equal to 0, it indicates that explicit weighted prediction is not applied to the B slices indicated by this PPS. When sps_weighted_bipred_flag is equal to 0, the value of pps_weighted_bipred_flag should be equal to 0.

pps_wp_multi_weights_flag is the enable control information for the picture layer, which relates to the fact that a single reference picture has multiple sets of weighted prediction parameters. When pps_wp_multi_weights_flag is equal to 1, it indicates that a single reference picture of the picture indicated by this PPS has multiple sets of weighted prediction parameters; and conversely, when pps_wp_multi_weights_flag is equal to 0, it indicates that a single reference picture of a picture indicated by this PPS has only one set of weighted prediction parameters. When sps_wp_multi_weights_flag is equal to 0, the value of pps_wp_multi_weights_flag should be equal to 0.

When pps_no_pic_partition_flag is equal to 1, it indicates that picture partition is not applied to any of the pictures indicated by this PPS; and when pps_no_pic_partition_flag is equal to 0, it indicates that each picture indicated by this PPS may possibly be partitioned into multiple tiles or slices.

When pps_rpl_info_in_ph_flag is equal to 1, it indicates that reference picture list (RPL) information is present in the picture header (PH) syntax structure and is not present in the slice header indicated by this PPS that does not contain a PH syntax structure. When pps_rpl_info_in_ph_flag is equal to 0, it indicates that RPL information is not present in the PH syntax structure and may possibly be present in the slice header indicated by this PPS.

When pps_wp_info_in_ph_flag is equal to 1, it indicates that weighted prediction information may possibly be present in the PH syntax structure and is not present in the slice header indicated by this PPS that does not contain a PH syntax structure. When pps_wp_info_in_ph_flag is equal to 0, it indicates that the weighted prediction information is not present in the PH syntax structure and may possibly be present in the slice header indicated by this PPS.

TABLE 2

|  | Descriptor |
|---|---|
| pic_parameter_set_rbsp( ) { | |
| ...... | |
| pps_weighted_pred_flag | u(1) |
| pps_weighted_bipred_flag | u(1) |
| if (pps_weighted_pred_flag \|\| pps_weighted_bipred_flag) | |
| pps_wp_multi_weights_flag | u(1) |
| ...... | |
| if( !pps_no_pic_partition_flag ) { | |
| pps_rpl_info_in_ph_flag | u(1) |
| ...... | |
| if( ( pps_weighted_pred_flag \|\| pps_weighted_bipred_flag ) && pps_rpl_info_in_ph_flag ) | |
| pps_wp_info_in_ph_flag | u(1) |
| ...... | |
| } | |

In another implementation, the embodiment gives identification information for the region-adaptive weighted prediction parameters contained in the picture header (PH) in the code stream. The weighted prediction parameters contained in the PH may be referenced by the current picture, a slice in the current picture, and/or a CTU or CU in the current picture.

The syntax and semantics in Table 3 are defined as follows:

When ph_inter_slice_allowed_flag is equal to 0, it indicates that all coding slices of this picture are of the intra-frame prediction type (I slice). When ph_inter_slice_allowed_flag is equal to 1, it indicates that the picture is allowed to contain one or more unidirectional or bi-directional inter-frame prediction type slices (P slices or B slices).

multi_pred_weights_table( ) is a value table containing the weighted prediction parameters, where a single reference picture can have multiple sets of weighted prediction parameters (weight+offset). When determining to apply the inter-frame weighted prediction technique and the weighted prediction information may possibly be present in the PH, if pps_wp_multi_weights_flag is equal to 1, the weighted prediction parameter may be acquired from this table.

pred_weight_table( ) is a value table containing the weighted prediction parameters, where a single reference picture has only a single set of weighted prediction parameters (weight+offset). When determining to apply the inter-frame weighted prediction technique and the weighted prediction information may possibly be present in the PH, if pps_wp_multi_weights_flag is equal to 0, the weighted prediction parameter may be acquired from this table.

TABLE 3

|  | Descriptor |
|---|---|
| picture_header_structure( ) { | |
| ...... | |
| ph_inter_slice_allowed_flag | u(1) |
| ...... | |
| if( ph_inter_slice_allowed_flag ) { | |
| ...... | |

TABLE 3-continued

|  | Descriptor |
|---|---|
| if( ( pps_weighted_pred_flag \|\| pps_weighted_bipred_flag ) && pps_wp_info_in_ph_flag ) | |
| if( pps_wp_multi_weights_flag ) | |
| multi_pred_weights_table( ) | |
| else | |
| pred_weight_table( ) | |
| } | |
| ...... | |
| } | |

In another implementation, the embodiment gives identification information for the region-adaptive weighted prediction parameters contained in the slice header (SH) in the code stream. The weighted prediction parameters contained in the SH may be referenced by the current slice and/or a CTU or CU in the current slice.

The syntax and semantics in Table 4 are defined as follows:

When sh_picture_header_in_slice_header_flag is equal to 1, it indicates that the PH syntax structure is present in the slice header. When sh_picture_header_in_slice_header_flag is equal to 0, the PH syntax structure does not exist in the slice header, which means that the slice layer can inherit the identification information of the picture layer incompletely, and can flexibly select the coding tool.

Sh_slice_type indicates the coding type of the slice, which can be the intra-frame coding type (I slice), the unidirectional inter-frame coding type (P slice) and the bi-directional inter-frame coding type (B slice).

sh_wp_multi_weights_flag is the enable control information for the slice layer, which relates to the fact that a single reference picture has multiple sets of weighted prediction parameters. When sh_wp_multi_weights_flag is equal to 1, it indicates that a single reference picture of the picture slice indicated by this slice header (SH) has multiple sets of weighted prediction parameters; and conversely, when sh_wp_multi_weights_flag is equal to 0, it indicates that a single reference picture of a picture slice indicated by this SH has only one set of weighted prediction parameters. When pps_wp_multi_weights_flag is equal to 0, the value of sh_wp_multi_weights_flag should be equal to 0.

When determining to apply the inter-frame weighted prediction technique and the weighted prediction information may possibly be present in the SH, if pps_wp_multi_weights_flag is equal to 1, the weighted prediction parameter can be acquired from a value table multi_pred_weights_table( ); or if pps_wp_multi_weights_flag is equal to 0, the weighted prediction parameters may be acquired from a value table pred_weight_table( ).

TABLE 4

|  | Descriptor |
|---|---|
| slice_header( ) { | |
| sh_picture_header_in_slice_header_flag | u(1) |
| if( sh_picture_header_in_slice_header_flag ) | |
| picture_header_structure( ) | |
| ...... | |
| if( ph_inter_slice_allowed_flag ) | |
| sh_slice_type | ue(v) |
| ...... | |
| if( sh_slice_type != I ) { | |
| ...... | |
| if( !pps_wp_info_in_ph_flag && ( ( pps_weighted_pred_flag && sh_slice_type == | |

TABLE 4-continued

| | Descriptor |
|---|---|
| P ) \|\| ( pps_weighted_bipred_flag && sh_slice_type == B ) ) )<br>    sh_wp_multi_weights_flag<br>    if( sh_wp_multi_weights_flag )<br>        multi_pred_weights_table( )<br>    else<br>        pred_weight_table( )<br>}<br>......<br>} | |

In another implementation, the embodiment gives the syntax and semantics of a value table of weighted prediction parameters. pred_weight_table( ) and multi_pred_weights_table( ) are both value tables containing the weighted prediction parameters, with the difference being that the former defines that a single reference picture has only a single set of weighted prediction parameters, while the latter defines that a single reference picture can have multiple sets of weighted prediction parameters. Specifically, the syntax and semantics of pred_weight_table( ) can be found in the documentation description of International Standard H.266/VVC version 1; and the syntax and semantics of multi_pred_weights_table( ) are given in Table 5 and its description. Here, luma_log 2_weight_denom and delta_chroma_log 2_weight_denom are amplification coefficients for the weighting factors of luminance and chroma, respectively, so as to avoid floating-point operations on the coding side.

num_l0_weights indicates the number of weighting factors that need to be indicated for many entries (reference pictures) in the reference picture list 0 (RPL 0) when pps_wp_info_in_ph_flag is equal to 1. num_l0_weights has a value range of [0, Min(15, num_ref_entries[0][RplsIdx[0]])], where num_ref_entries[listIdx][rplsIdx] indicates the number of entries in the reference picture list syntax structure ref_pic_list_struct (listIdx, rplsIdx) When pps_wp_info_in_ph_flag is equal to 1, the variable NumWeightsL0 is set to num_l0_weights; and conversely, when pps_wp_info_in_ph_flag is equal to 0, the variable NumWeightsL0 is set to NumRefIdxActive[0]. Here, the value of NumRefIdxActive[i]−1 indicates the maximum reference index in the reference picture list i (RPL i) that may possibly be used to decode the slice. When the value of NumRefIdxActive[i] is 0, it indicates that there is no reference index in RPL i that is used for decoding the slice.

When luma_weight_l0_flag[i] is equal to 1, it indicates that the luminance component that uses the i-th entry (RefPicList[0][i]) in the reference list 0 for unidirectional prediction has weighting factors (weight+offset). When luma_weight_l0_flag[i] is equal to 0, it indicates that the above weighting factors do not exist.

When chroma_weight_l0_flag[i] is equal to 1, it indicates that the chroma prediction value that uses the i-th entry (RefPicList[0] [i]) in the reference list 0 for unidirectional prediction has weighting factors (weight+offset). When chroma_weight_l0_flag[i] is equal to 0, it indicates that the above weighting factor does not exist (the default situation).

num_l0_luma_pred_weights[i] indicates the number of weighting factors that need to be indicated for the luminance component of entry i (reference picture i) in the reference picture list 0 (RPL 0) when luma_weight_l0_flag[i] is equal to 1, i.e., the number of weighted prediction parameters that can be carried by the luminance component of a single reference picture i in the list 0.

delta_luma_weight_l0[i][k] and luma_offset_l0[i][k] indicate values of the k-th weight factor and offset of the luminance component of the i-th reference picture in the reference picture list 0, respectively.

num_l0_chroma_pred_weights[i][j] indicates the number of weighting factors that need to be indicated for the j-th chroma component of the entry i (reference picture i) in the reference picture list 0 (RPL 0) when chroma_weight_l0_flag[i] is equal to 1, i.e., the number of weighted prediction parameters that can be carried by the j-th chroma component of a single reference picture i in the list 0.

delta_chroma_weight_l0[i][j][k] and delta_chroma_offset_l0[i][j][k] indicate values of the k-th weight factor and offset of the j-th chroma component of the i-th reference picture in the reference picture list 0, respectively.

When bi-directional prediction is involved, in addition to the above weighted prediction parameter identification for the reference picture list 0, similar information identification is required for the reference picture list 1 (RPL 1), as shown in Table 5.

TABLE 5

| | Descriptor |
|---|---|
| multi_pred_weights_table( ) { | |
|   luma_log2_weight_denom | ue(v) |
|   if( sps_chroma_format_idc != 0 ) | |
|     delta_chroma_log2_weight_denom | se(v) |
|   if( pps_wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( sps_chroma_format_idc != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       num_l0_luma_pred_weights[ i ] | ue(v) |
|       for( k = 0; k < num_l0_luma_pred_weights[ i ]; k++ ) { | |
|         delta_luma_weight_l0[ i ][ k ] | se(v) |
|         luma_offset_l0[ i ][ k ] | se(v) |
|       } | |
|     } | |

TABLE 5-continued

| | Descriptor |
|---|---|
|     if( chroma_weight_l0_flag[ i ] ) | |
|       for( j = 0; j < 2; j++ ) { | |
|         num_l0_chroma_pred_weights[ i ][ j ] | ue(v) |
|         for( k = 0; k < num_l0_chroma_pred_weights[ i ][ j ]; k++ ) { | |
|           delta_chroma_weight_l0[ i ][ j ][ k ] | se(v) |
|           delta_chroma_offset_l0[ i ][ j ][ k ] | se(v) |
|         } | |
|       } | |
|     } | |
|   if( pps_weighted_bipred_flag && pps_wp_info_in_ph_flag && num_ref_entries[ 1 ][ RplsIdx[ 1 ] ] > 0 ) | |
|     num_l1_weights | ue(v) |
|   for( i = 0; i < NumWeightsL1; i++ ) | |
|     luma_weight_l1_flag[ i ] | u(1) |
|   if( sps_chroma_format_idc != 0 ) | |
|     for( i = 0; i < NumWeightsL1; i++ ) | |
|       chroma_weight_l1_flag[ i ] | u(1) |
|   for( i = 0; i < Num WeightsL1; i++ ) { | |
|     if( luma_weight_l1_flag[ i ] ) { | |
|       num_l1_luma_pred_weights[ i ] | ue(v) |
|       for( k = 0; k < num_l1_luma_pred_weights[ i ]; k++ ) { | |
|         delta_luma_weight_l1[ i ][ k ] | se(v) |
|         luma_offset_l1[ i ][ k ] | se(v) |
|       } | |
|     } | |
|     if( chroma_weight_l1_flag[ i ] ) | |
|       for( j = 0; j < 2; j++ ) { | |
|         num_l1_chroma_pred_weights[ i ][ j ] | ue(v) |
|         for( k = 0; k < num_l1_chroma_pred_weights[ i ][ j ]; k++ ) { | |
|           delta_chroma_weight_l1[ i ][ j ][ k ] | se(v) |
|           delta_chroma_offset_l1[ i ][ j ][ k ] | se(v) |
|         } | |
|       } | |
|     } | |
|   } | |
| } | |

In another implementation, this embodiment gives the syntax and semantics of another value table of weighted prediction parameters. pred_weight_table ( ) and multi_pred_weights_table ( ) are both value tables containing the weighted prediction parameters, with the difference being that the former defines that a single reference picture has only a single set of weighted prediction parameters, while the latter defines that a single reference picture can have multiple sets of weighted prediction parameters. Specifically, the syntax and semantics of pred_weight_table( ) can be found in the documentation description of International Standard H.266/VVC version 1; and the syntax and semantics of multi_pred_weights_table( ) are given in Table 6 and its description. In embodiment eleven, multi_pred_weights_table( ) involves numerous entries in the reference picture list, which means that, for all of the specified multiple reference pictures, it is necessary to determine whether or not there exist weighting factors, and a single reference picture for which there exist weighting factors may also possibly have multiple sets of weighted prediction parameters (including weights and offsets). In contrast, this embodiment is a special case of embodiment eleven, where only one reference picture in each reference picture list is considered, which means that when determining to apply the weighted prediction technique, that reference picture is directly specified to have multiple sets of weighted prediction parameters. The meanings of the fields in Table 6 are the same as the corresponding semantic interpretations of the fields in Table 5.

TABLE 6

| | Descriptor |
|---|---|
| multi_pred_weights_table( ) { | |
|   luma_log2_weight_denom | ue(v) |
|   if( sps_chroma_format_idc != 0 ) | |
|     delta_chroma_log2_weight_denom | se(v) |
|   num_l0_luma_pred_weights | ue(v) |
|   for( i= 0; i < num_l0_luma_pred_weights; i++ ) { | |
|     delta_luma_weight_l0[ i ] | se(v) |
|     luma_offset_l0[ i ] | se(v) |
|   } | |
|   if( sps_chroma_format_idc != 0 ) | |
|     for( j = 0; j < 2; j++ ) { | |
|       num_l0_chroma_pred_weights[ j ] | ue(v) |
|       for( i = 0; i < num_l0_chroma_pred_weights[ j ]; i++ ) { | |
|         delta_chroma_weight_l0[ j ][ i ] | se(v) |
|         delta_chroma_offset_l0[ j ][ i ] | se(v) |
|       } | |
|     } | |
|   if( pps_weighted_bipred_flag ){ | |
|     num_l1_luma_pred_weights | ue(v) |
|     for( i = 0; i < num_l1_luma_pred_weights; i++ ) { | |
|       delta_luma_weight_l1[ i ] | se(v) |
|       luma_offset_l1[ i ] | se(v) |
|     } | |
|     if( sps_chroma_format_idc != 0 ) | |
|       for( j = 0; j < 2; j++ ) { | |
|         num_l1_chroma_pred_weights[ j ] | ue(v) |
|         for( i = 0; i < num_l1_chroma_pred_weights[ j ]; i++ ) { | |
|           delta_chroma_weight_l1[ j ][ i ] | se(v) |

TABLE 6-continued

| | Descriptor |
|---|---|
|             delta_chroma_offset_l1[ j ][ i ] | se(v) |
|         } | |
|       } | |
|     } | |
| } | |

In another implementation, the identification information and parameters for region-adaptive weighted prediction are given in the coding tree unit (CTU).

The weighted prediction parameter information in the CTU may be independently identified or may reference those in other parameter sets (e.g., the sequence layer parameter set (SPS) and the picture layer parameter set (PPS)) or header information (e.g., the picture header (PH) and the slice header (SH)), and may also record weighted prediction parameter differences, or may record weighted prediction parameter index information and differences. When the weighted prediction parameter information in the CTU is recorded differences, or recorded index information and differences, it refers to acquiring a weighted value from the other parameter sets or header information, and adding a difference value from the CTU, so that the weighted prediction parameter finally applied to the CTU or CU can be acquired. When the weighted prediction parameter information is included in units of CTUs, refined luminance gradual change effects such as circle gradual changes and radial gradual changes can be realized in units of CTUs.

When identifying the weighted prediction parameter information in the CTU, the specific code stream organization method may be shown in Table 7.

In Table 7, when a single reference picture in the reference picture list (RPL) has only one set of weighted prediction parameters, for example, when the indication information sh_wp_multi_weights_flag is equal to 0, the weighted prediction parameter difference may be set directly in the CTU; and when a single reference picture in the reference picture list has multiple sets of weighted prediction parameters, for example, when the indication information sh_wp_multi_weights_flag is equal to 1, the CTU needs to identify a certain set of weighted prediction parameters of its own index, as well as weighted prediction parameter differences.

The weighted prediction parameters that are finally applied to the current CTU are the specific weighted prediction parameters of the reference picture plus the weighted prediction parameter differences defined in coding_tree_unit( ).

The weighted prediction parameter differences include, but are not limited to, the weighted prediction parameter differences (ctu_delta_luma_weight_l0 and ctu_delta_luma_offset_l0) for the luminance component in the RPL0, the weighted prediction parameter differences (ctu_delta_chroma_weight_l0[i] and ctu_delta_chroma_offset_l0[i]) for the chroma component in the RPL0, the weighted prediction parameter differences (ctu_delta_luma_weight_l1 and ctu_delta_luma_offset_l1) for the luminance component in the RPL1, and the weighted prediction parameter differences (ctu_delta_chroma_weight_l1[i] and ctu_delta_chroma_offset_l1[i]) for the chroma component in the RPL1.

The weighted prediction parameter index information, includes, but is not limited to, the weighted prediction parameter index number (ctu_index_l0_luma_pred_weights) for the luminance component in the RPL0, the weighted prediction parameter index number (ctu_index_l0_chroma_pred_weights[i]) for the chroma component in the RPL0, the weighted prediction parameter index number (ctu_index_l1_luma_pred_weights) for the luminance component in the RPL1, and the weighted prediction parameter index number (ctu_index_l1_chroma_pred_weights[i]) for the chroma component in the RPL1.

In summary, the weighted prediction parameters that are finally applied to the current CTU are the specific weighted prediction parameters of the reference picture plus the weighted prediction parameter differences defined in coding_tree_unit( ).

TABLE 7

| | Descriptor |
|---|---|
| coding_tree_unit( ) { | |
|   ...... | |
|   if ( !sh_wp_multi_weights_flag ) { | |
|     ctu_delta_luma_weight_l0 | se(v) |
|     ctu_delta_luma_offset_l0 | se(v) |
|     if( sps_chroma_format_idc != 0 ) | |
|       for( i = 0; i < 2; i++ ) { | |
|         ctu_delta_chroma_weight_l0[ i ] | se(v) |
|         ctu_delta_chroma_offset_l0[ i ] | se(v) |
|       } | |
|     if( pps_weighted_bipred_flag ) { | |
|       ctu_delta_luma_weight_l1 | se(v) |
|       ctu_delta_luma_offset_l1 | se(v) |
|       if( sps_chroma_format_idc != 0 ) | |
|         for( i = 0; i < 2; i++ ) { | |
|           ctu_delta_chroma_weight_l1[ i ] | se(v) |
|           ctu_delta_chroma_offset_l1[ i ] | se(v) |
|         } | |
|     } | |
|   } | |
|   else { | |
|     ctu_index_l0_luma_pred_weights | se(v) |
|     ctu_delta_luma_weight_l0 | se(v) |
|     ctu_delta_luma_offset_l0 | se(v) |
|     if( sps_chroma_format_idc != 0 ) | |
|       for( i = 0; i < 2; i++ ) { | |
|         ctu_index_l0_chroma_pred_weights[ i ] | se(v) |
|         ctu_delta_chroma_weight_l0[ i ] | se(v) |
|         ctu_delta_chroma_offset_l0[ i ] | se(v) |
|       } | |
|     if( pps_weighted_bipred_flag ){ | |
|       ctu_index_l1_luma_pred_weights | se(v) |
|       ctu_delta_luma_weight_l1 | se(v) |
|       ctu_delta_luma_offset_l1 | se(v) |
|       if( sps_chroma_format_idc != 0 ) | |
|         for( i = 0; i < 2; i++ ) { | |
|           ctu_index_l1_chroma_pred_weights[ i ] | se(v) |
|           ctu_delta_chroma_weight_l1[ i ] | se(v) |
|           ctu_delta_chroma_offset_l1[ i ] | se(v) |
|         } | |
|     } | |
|   } | |
|   ...... | |
| } | |

In another implementation, the identification information and parameters for region-adaptive weighted prediction are given in the coding unit (CU).

The weighted prediction parameter information in the CU may be independently identified or may reference those in other parameter sets (e.g., the sequence layer parameter set (SPS) and the picture layer parameter set (PPS)) or header information (e.g., the picture header (PH) and the slice header (SH)) or the coding tree unit (CTU), and may also record weighted prediction parameter differences, or may record weighted prediction parameter index information and differences. When the weighted prediction parameter information in the CU is recorded differences, or recorded index information and differences, it refers to acquiring a weighted value from the other parameter sets or header information, and adding a difference value from the CU, so that the weighted prediction parameter finally applied to the CU can be acquired. When the weighted prediction parameter information is included in units of CUs, refined luminance gradual change effects such as circle gradual changes and radial gradual changes can be realized in units of CUs.

When identifying the weighted prediction parameter information in the CU, the specific code stream organization method may be shown in Table 8.

Here, cu_pred_weights_adjust_flag indicates whether the weighted prediction parameter values to which the current CU is indexed need to be adjusted. When cu_pred_weights_adjust_flag is equal to 1, it indicates that the current CU needs to adjust the weighted prediction parameter value, that is, the weighted prediction parameter values finally applied to the current CU are the sum of the weighted prediction parameter values of the CTU level and the differences as identified by the CU level; and when cu_pred_weights_adjust_flag is equal to 1, it indicates that the current CU directly uses the weighted prediction parameter values determined by the CTU level.

In Table 8, the weighted prediction parameter differences identified by the CU level include weighted prediction parameter differences (cu_delta_luma_weight_l0 and cu_delta_luma_offset_l0) for the luminance component in the RPL0.

If the current CU includes a chroma component, the weighted prediction parameter differences identified by the CU level also include weighted prediction parameter differences for the various chroma components; and if the current CU is bi-directionally predicted, the weighted prediction parameter differences identified by the CU level also include weighted prediction parameter differences for the luminance component and/or various chroma components in the RPL1.

In summary, the weighted prediction parameters that are finally applied to the current CU are the specific weighted prediction parameters carried in data of the upper levels (e.g., the CTU level, the slice level, the subpicture level) in the coding and decoding structure plus the weighted prediction parameter differences defined in coding_unit( ).

TABLE 8

|  | Descriptor |
| --- | --- |
| coding_unit( ) { | |
| ...... | |
|   cu_pred_weights_adjust_flag | u(1) |
|   if ( cu_pred_weights_adjust_flag ) | |
|     cu_delta_luma_weight_l0 | se(v) |
|     cu_delta_luma_offset_l0 | se(v) |
| ...... | |
| } | |

In another implementation, the identification information and parameters for region-adaptive weighted prediction are given in supplemental enhancement information (SEI).

The NAL unit type in the network abstraction layer unit header information nal_unit_header( ) is set to 23 to indicate the front SEI information. sei_rbsp( ) contains the related code stream sei_message( ), and sei_message( ) contains payload information. It is only necessary to set the payloadType to take a different value than the other SEI information in the current H.266/VVC version 1 (e.g., it may take the value of 100), and then the payload_size_byte contains the code stream information related to the region-adaptive weighted prediction. The specific code stream organization method is as shown in Table 7.

When multi_pred_weights_cancel_flag is 1, the SEI information related to the previous picture is canceled and the associated SEI function is not used for that picture; when multi_pred_weights_cancel_flag is 0, the previous SEI information is carried over (during the decoding process, if the current picture does not carry SEI information, the SEI information of the preceding picture retained in the memory is carried over to the decoding process of the current picture) and the relevant SEI function is enabled for that picture; when multi_pred_weights_persistence_flag is 1, the SEI information is applied to the current picture and the picture after the current layer; and when multi_pred_weights_persistence_flag is 0, the SEI information is only applied to the current picture. The meanings of other fields in Table 9 are the same as the corresponding semantic interpretations of the fields in Table 5.

TABLE 9

|  | Descriptor |
| --- | --- |
| multi_pred_weights_info( payloadSize ) { | |
|   multi_pred_weights_cancel_flag | u(1) |
|   if( !multi_pred_weights_cancel_flag ){ | |
|     multi_pred_weights_persistence_flag | u(1) |
|     luma_log2_weight_denom | ue(v) |
|     if( sps_chroma_format_idc != 0 ) | |
|       delta_chroma_log2_weight_denom | se(v) |
|     if( pps_wp_info_in_ph_flag ) | |
|       num_l0_weights | ue(v) |
|     for( i = 0; i < NumWeightsL0; i++ ) | |
|       luma_weight_l0_flag[ i ] | u(1) |
|     if( sps_chroma_format_idc != 0 ) | |
|       for( i = 0; i < NumWeightsL0; i++ ) | |
|         chroma_weight_l0_flag[ i ] | u(1) |
|     for( i = 0; i < NumWeightsL0; i++ ) { | |
|       if( luma_weight_l0_flag[ i ] ) { | |
|         num_l0_luma_pred_weights[ i ] | ue(v) |
|         for( k = 0; k < num_l0_luma_pred_weights[ i ]; k++ ) { | |
|           delta_luma_weight_l0[ i ][ k ] | se(v) |
|           luma_offset_l0[ i ][ k ] | se(v) |
|         } | |
|       } | |
|       if( chroma_weight_l0_flag[ i ] ) | |
|         for( j = 0; j < 2; j++ ) { | |
|           num_l0_chroma_pred_weights[ i ][ j ] | ue(v) |
|           for( k = 0; k < num_l0_chroma_pred_weights[ i ][ j ]; | |

TABLE 9-continued

| | Descriptor |
|---|---|
| k++ ) { | |
|         delta_chroma_weight_l0[ i ][ j ][ k ] | se(v) |
|         delta_chroma_offset_l0[ i ][ j ][ k ] | se(v) |
|       } | |
|     } | |
|   } | |
|   if( pps_weighted_bipred_flag && pps_wp_info_in_ph_flag | |
|     &&   num_ref_entries[ 1 ][ RplsIdx[ 1 ] ] > 0 ) | |
|     num_l1_weights | ue(v) |
|   for( i = 0; i < NumWeightsL1; i++ ) | |
|     luma_weight_l1_flag[ i ] | u(1) |
|   if( sps_chroma_format_idc != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       num_l1_luma_pred_weights[ i ] | ue(v) |
|       for( k = 0; k < num_l1_luma_pred_weights[ i ]; k++ ) { | |
|         delta_luma_weight_l1[ i ][ k ] | se(v) |
|         luma_offset_l1[ i ][ k ] | se(v) |
|       } | |
|     } | |
|     if( chroma_weight_l1_flag[ i ] ) | |
|       for( j = 0; j < 2; j++ ) { | |
|         num_l1_chroma_pred_weights[ i ][ j ] | ue(v) |
|         for( k = 0; k < num_l1_chroma_pred_weights[ i ][ j ]; k++ ) { | |
|           delta_chroma_weight_l1[ i ][ j ][ k ] | se(v) |
|           delta_chroma_offset_l1[ i ][ j ][ k ] | se(v) |
|         } | |
|       } | |
|   } | |
| } | |

In another implementation, the identification information and parameters for region-adaptive weighted prediction are given in the media description information. Here, the media description information includes, but is not limited to, the media presentation description (MPD) information in the dynamic adaptive streaming over HTTP (DASH) protocol, and the media asset descriptor information in the MPEG media transport (MMT) protocol. Taking the media asset descriptor in the MMT as an example, its code stream organization method for region-adaptive weighted prediction information is shown in Table 10. The syntax and field meanings in Table 10 are the same as the corresponding semantic interpretations of the fields in Table 5.

TABLE 10

| | Descriptor |
|---|---|
| Asset_descriptor( ) { | |
|   ...... | |
|   luma_log2_weight_denom | ue(v) |
|   if( sps_chroma_format_idc != 0 ) | |
|     delta_chroma_log2_weight_denom | se(v) |
|   if( pps_wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( sps_chroma_format_idc != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       num_l0_luma_pred_weights[ i ] | ue(v) |
|       for( k = 0; k < num_l0_luma_pred_weights[ i ]; k++ ) { | |
|         delta_luma_weight_l0[ i ][ k ] | se(v) |
|         luma_offset_l0[ i ][ k ] | se(v) |
|       } | |
|     } | |
|     if( chroma_weight_l0_flag[ i ] ) | |
|       for( j = 0; j < 2; j++ ) { | |
|         num_l0_chroma_pred_weights[ i ][ j ] | ue(v) |
|         for( k = 0; k < num_l0_chroma_pred_weights[ i ][ j ]; k++ ) { | |
|           delta_chroma_weight_l0[ i ][ j ][ k ] | se(v) |
|           delta_chroma_offset_l0[ i ][ j ][ k ] | se(v) |

TABLE 10-continued

| | Descriptor |
|---|---|
| `        }` | |
| `      }` | |
| `    }` | |
| `    if( pps_weighted_bipred_flag && pps_wp_info_in_ph_flag` | |
| `        && num_ref_entries[1][RplsIdx[1]] > 0 )` | |
| `      num_l1_weights` | ue(v) |
| `    for( i = 0; i < NumWeightsL1; i++ )` | |
| `      luma_weight_l1_flag[i]` | u(1) |
| `    if( sps_chroma_format_idc != 0 )` | |
| `      for( i = 0; i < NumWeightsL1; i++ )` | |
| `        chroma_weight_l1_flag[i]` | u(1) |
| `    for( i = 0; i < NumWeightsL1; i++ ) {` | |
| `      if( luma_weight_l1_flag[i] ) {` | |
| `        num_l1_luma_pred_weights[ i ]` | ue(v) |
| `        for( k = 0; k < num_l1_luma_pred_weights[ i ]; k++ ) {` | |
| `          delta_luma_weight_l1[i][ k ]` | se(v) |
| `          luma_offset_l1[i][ k ]` | se(v) |
| `        }` | |
| `      }` | |
| `      if( chroma_weight_l1_flag[i] )` | |
| `        for( j = 0; j < 2; j++ ) {` | |
| `          num_l1_chroma_pred_weights[ i ][ j ]` | ue(v) |
| `          for( k = 0; k <` | |
| `num_l1_chroma_pred_weights[ i ][ j ]; k++ ) {` | |
| `            delta_chroma_weight_l1[i][j][ k ]` | se(v) |
| `            delta_chroma_offset_l1[i][j][ k ]` | se(v) |
| `          }` | |
| `      }` | |
| `    }` | |
| `}` | |

Figure 11:
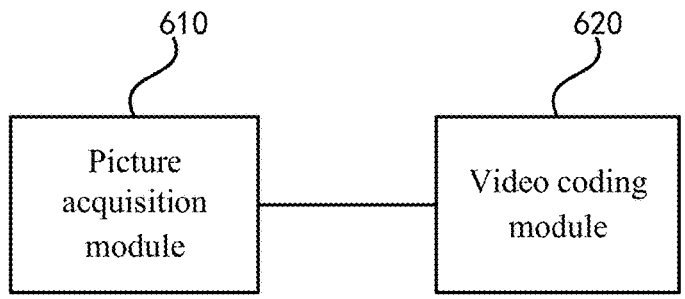
FIG. 11 is a schematic diagram of a video coding apparatus according to an embodiment of the present disclosure.

FIG. 11 is a schematic diagram of a video coding apparatus according to an embodiment of the present disclosure. It can perform a video coding method according to any embodiment of the present disclosure, and has corresponding functional modules and beneficial effects for performing the method. This apparatus may be implemented by software and/or hardware, and specifically includes: a picture acquisition module 610 and a video coding module 620.

The picture acquisition module 610 is used for acquiring a video picture, where the video picture is at least one frame of picture of a video.

The video coding module 620 is used for performing weighted predictive coding of the video picture to generate a picture code stream, where the weighted predictive coding uses at least one set of weighted prediction identification information and parameters.

In embodiments of the present disclosure, by acquiring a video picture by the picture acquisition module, which is at least one frame of picture in a video, and performing weighted predictive coding on the video picture to generate a picture code stream by the video coding module, where the weighted predictive coding process uses at least one set of weighted prediction identification information and parameters, flexible coding of the video picture is realized, which can improve the video coding efficiency and reduce the influence of the luminance change of the video picture on the coding efficiency.

Further, on the basis of the above embodiment of the present disclosure, the apparatus further includes:
   a change determination module for determining a luminance change situation according to a result of comparison of the video picture with a reference picture.

Further, on the basis of the above embodiment of the present disclosure, the luminance change situation includes at least one of: a picture luminance change mean value, or a pixel point luminance change value.

Further, on the basis of the above embodiment of the present disclosure, the video coding module 620 includes:
   a coding processing unit for performing weighted predictive coding of the video picture according to a luminance change situation of the video picture.

Further, on the basis of the above embodiment of the present disclosure, the coding processing unit is specifically used for: in the case where the luminance change situation is the luminance being consistent throughout the entire frame of picture, performing weighted predictive coding of the video picture; or in the case where the luminance change situation is the luminance being consistent within picture segments, determining to separately perform weighted predictive coding on each of the picture segments within the video picture.

Further, on the basis of the above embodiment of the present disclosure, one set of said weighted prediction identification information and parameters used in the weighted predictive coding in the apparatus correspond to one frame of said video picture or at least one picture segment of the video picture.

Further, on the basis of the above embodiment of the present disclosure, the specification of the picture segment in the apparatus includes at least one of: slice, tile, subpicture, coding tree unit, or coding unit.

Further, on the basis of the above embodiment of the present disclosure, the apparatus further includes:
   a code stream write module for writing the weighted prediction identification information and parameters to the picture code stream.

Further, on the basis of the above embodiment of the present disclosure, the weighted prediction identification information and the parameters in the apparatus are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

Further, on the basis of the above embodiment of the present disclosure, the weighted prediction identification information and the parameters in the apparatus include at least one of the following information: reference picture index information, weighted prediction enable control information, region-adaptive weighted prediction enable control information, or weighted prediction parameters.

Further, on the basis of the above embodiment of the present disclosure, the picture code stream in the apparatus includes a transport stream or a media file.

Further, on the basis of the above embodiment of the present disclosure, the video coding module 620 further includes:

a deep learning unit for performing weighted predictive coding of the video picture according to a pre-trained neural network model.

Further, on the basis of the above embodiment of the present disclosure, the weighted prediction identification information in the apparatus further includes a neural network model structure and a neural network model parameter.

Figure 12:
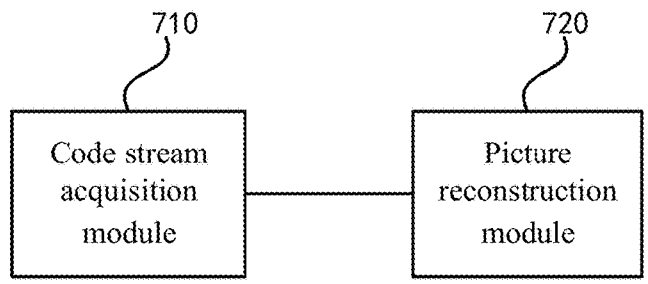
FIG. 12 is a schematic diagram of a video decoding apparatus according to an embodiment of the present disclosure.

FIG. 12 is a schematic diagram of a video decoding apparatus according to an embodiment of the present disclosure. It can perform a video decoding method according to any embodiment of the present disclosure, and has corresponding functional modules and beneficial effects for performing the method. This apparatus may be implemented by software and/or hardware, and specifically includes: a code stream acquisition module 710 and a picture reconstruction module 720.

The code stream acquisition module 710 is used for acquiring a picture code stream and parsing weighted prediction identification information and parameters in the picture code stream.

The picture reconstruction module 720 is used for decoding the picture code stream according to the weighted prediction identification information and parameters to generate a reconstructed picture.

In embodiments of the present disclosure, by acquiring a picture code stream by the code stream acquisition module and acquiring weighted prediction identification information and parameters in the picture code stream, and processing the picture code stream by the picture reconstruction module in accordance with the acquired weighted prediction identification information and parameters to generate a reconstructed picture, the dynamic decoding of the picture code stream is realized, which can improve the video decoding efficiency and reduce the influence of luminance changes of the picture on the video decoding efficiency.

Further, on the basis of the above embodiment of the present disclosure, the number of the weighted prediction identification information and parameters in the picture code stream in the apparatus is at least one set.

Further, on the basis of the above embodiment of the present disclosure, the weighted prediction identification information and the parameters in the apparatus are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

Further, on the basis of the above embodiment of the present disclosure, the weighted prediction identification information and the parameters in the apparatus include at least one of the following information: reference picture index information, weighted prediction enable control information, region-adaptive weighted prediction enable control information, or weighted prediction parameters.

Further, on the basis of the above embodiment of the present disclosure, the picture code stream in the apparatus includes a transport stream or a media file.

Further, on the basis of the above embodiment of the present disclosure, the picture reconstruction module 720 includes:

a deep learning decoding unit for performing weighted predictive decoding of the picture code stream using the weighted prediction identification information and parameters according to a pre-trained neural network model to generate a reconstructed picture.

Further, on the basis of the above embodiment of the present disclosure, the weighted prediction identification information and parameters in the apparatus further include a neural network model structure and a neural network model parameter.

Figure 13:
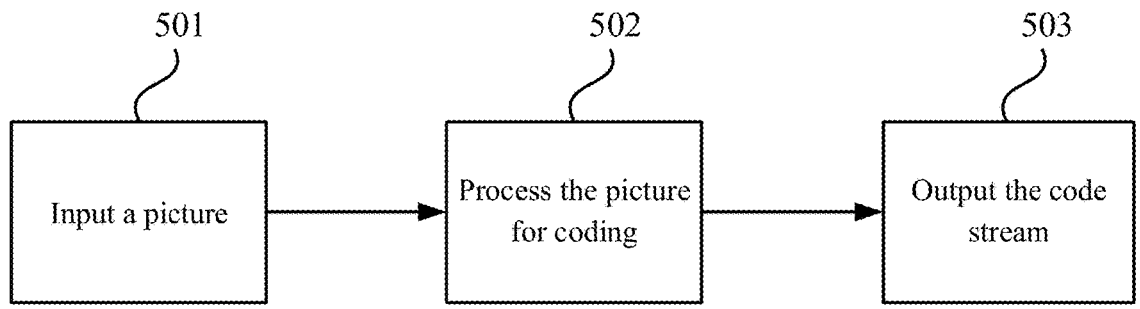
FIG. 13 is a schematic diagram of a coder according to an embodiment of the present disclosure.

In some examples, FIG. 13 is a schematic diagram of a coder according to an embodiment of the present disclosure. The coder shown in FIG. 13 applies to an apparatus for coding processing of a video. The input to the apparatus is a picture contained in a video, and the output is a picture code stream or a transport stream or a media file containing the picture code stream. This coder is used for the following steps: At step 501: a picture is inputted. At step 502: the coder processes the picture and codes it. The specific operation process may be the video coding method as provided in any of the above embodiments. At step 503: a code stream is outputted.

Figure 14:
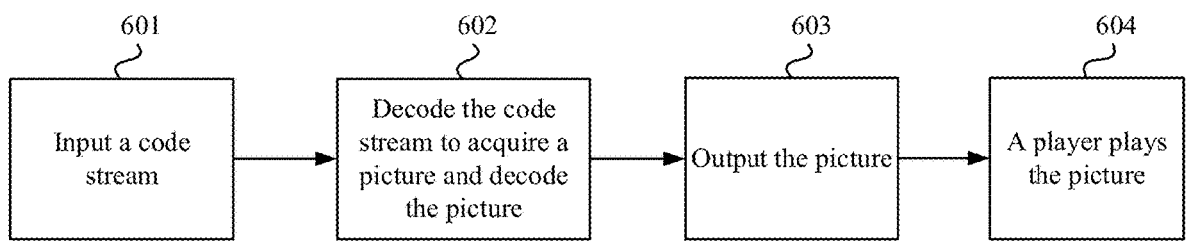
FIG. 14 is a schematic diagram of a decoder according to an embodiment of the present disclosure.

In some examples, FIG. 14 is a schematic diagram of a decoder according to an embodiment of the present disclosure. The decoder shown in FIG. 14 applies to an apparatus for decoding processing of a video. The input to the apparatus is a picture code stream or a transport stream or a media file containing the picture code stream, and the output is pictures constituting the video. The decoder is used for the following steps: At step 601: a picture is inputted. At step 602: the decoder parses the code stream to obtain a picture and decodes the picture. The specific operation process example is as illustrated in the video decoding method according to any of the above embodiments. At step 603, the picture is outputted. At step 604, a player plays the picture.

Figure 15:
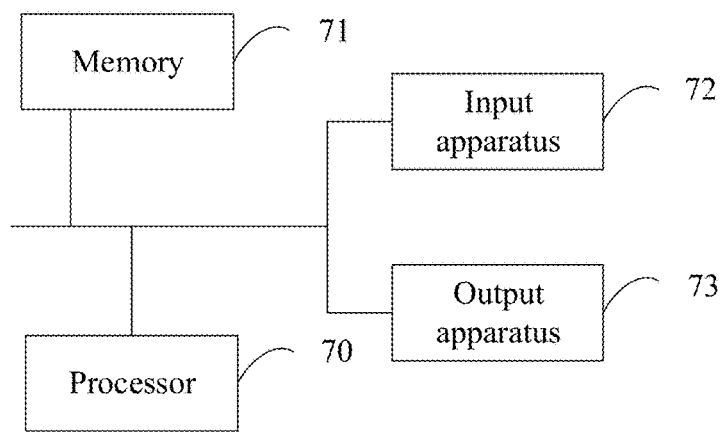
FIG. 15 is a schematic diagram of an electronic device according to an embodiment of the present disclosure.

FIG. 15 is a schematic diagram of an electronic device according to an embodiment of the present disclosure. The electronic device includes a processor 70, a memory 71, an input apparatus 72, and an output apparatus 73. The number of processors 70 in the electronic device can be one or more, and one processor 70 is shown as an example in FIG. 15. The processor 70, the memory 71, the input apparatus 72, and the output apparatus 73 in the electronic device can be connected by a bus or in other ways. In FIG. 15, the connection is realized by a bus as an example.

The memory 71, as a computer-readable storage medium, can be used to store software programs, computer-executable programs and modules, such as modules (the picture acquisition module 610 and the video coding module 620, or the code stream acquisition module 710 and the picture reconstruction module 720) corresponding to the video coding apparatus or video decoding apparatus in the embodiments of the present disclosure. The processor 70 executes various functional applications of the electronic device as well as data processing by running the software programs, instructions, and modules stored in the memory 71, i.e., to implement any of the methods described above.

The memory 71 may mainly include a storage program area and a storage data area, where the storage program area may store an operating system and application program(s) required by at least one function, and the storage data area may store data created according to the use of the electronic device, etc. In addition, the memory 71 may include a high-speed random access memory and a non-volatile memory, for example, at least one magnetic disk storage device, a flash memory device, or other non-volatile solid-state storage devices. In some embodiments, the memory 71 may further include memories remotely located with respect to the processor 70, and these remote memories may be connected to electronic devices via a network. Embodiments of the above-mentioned network include the Internet, an intranet, a local area network, a mobile communication network, and a combination thereof.

The input apparatus 72 may be configured to receive an input numerical digit or character information and generate a key signal input related to user settings and function control of the electronic device. The output apparatus 73 may include a display device such as a display screen.

A further embodiment of the present disclosure provides a storage medium containing computer-executable instructions which, when executed by a computer processor, cause the computer processor to perform a video coding method, the method including:
acquiring a video picture, where the video picture is at least one frame of picture of a video; and
performing weighted predictive coding of the video picture to generate a picture code stream, where the weighted predictive coding uses at least one set of weighted prediction identification information and parameters.

Alternatively, the computer-executable instructions, when executed by a computer processor, cause the computer processor to perform a video decoding method, the method including:
acquiring a picture code stream and parsing weighted prediction identification information and parameters in the picture code stream; and
decoding the picture code stream according to the weighted prediction identification information and parameters to generate a reconstructed picture.

Through the description of the above embodiments, those having ordinary skill in the art can clearly understand that the present disclosure may be implemented by means of software and essential general-purpose hardware, and of course may alternatively be implemented by hardware, however the former is preferred in many cases. Based on this understanding, the essential part or the part contributing to the prior art of the technical schemes of the present disclosure may be embodied in the form of software products, which may be stored in a computer-readable storage medium (such as a floppy disk, read-only memory (ROM), random access memory (RAM), flash, hard disk and optical disk) and include instructions to cause a computer device (such as a personal computer, a server, or a network device) to perform the methods of the embodiments of the present disclosure.

It is to be noted that, in the above embodiments of apparatus and device, the units and modules included are divided only according to functional logic, and are not limited to the above division, as long as the corresponding functions can be achieved. In addition, the specific names of the functional units are only for the convenience of distinguishment, and are not used to limit the scope of protection of the present disclosure.

It can be understood by those of ordinary skill in the art that all or some of the steps of the methods, systems and functional modules/units in the devices disclosed above can be implemented as software, firmware, hardware and appropriate combinations thereof.

In a hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

Some embodiments of the present disclosure have been described above with reference to the accompanying drawings and are not to limit the scope of the present disclosure. Any modifications, equivalent substitutions, and improvements made by those of ordinary skill in the art without departing from the scope and essence of the present disclosure shall fall within the scope of the present disclosure.

What is claimed is:

1. A video coding method, comprising:
acquiring a video picture, wherein the video picture is at least one frame of picture of a video; and
performing weighted predictive coding of the video picture to generate a picture code stream, wherein the weighted predictive coding uses at least one set of weighted prediction identification information and parameters;
wherein said performing weighted predictive coding of the video picture to generate a picture code stream comprises:
performing weighted predictive coding of the video picture according to a luminance change situation of the video picture relative to a reference picture, comprising at least one of:
in the case where the luminance change situation is the luminance being consistent throughout the entire frame of picture, performing weighted predictive coding of the video picture; or
in the case where the luminance change situation is the luminance being consistent within picture segments, determining to separately perform weighted predictive coding on each of the picture segments within the video picture.

2. The method of claim 1, further comprising:
determining a luminance change situation according to a result of comparison of the video picture with a reference picture.

3. The method of claim 2, wherein the luminance change situation comprises at least one of:
a picture luminance change mean value, or a pixel point luminance change value.

4. The method of claim 1, wherein the video picture has at least one set of said weighted prediction identification information and parameters present for the reference picture or picture segments of the reference picture.

5. The method of claim 1, wherein one set of said weighted prediction identification information and parameters used in the weighted predictive coding correspond to one frame of said video picture or at least one picture segment of the video picture.

6. The method of claim 5, wherein a specification of the picture segment comprises at least one of:
slice, tile, subpicture, coding tree unit, or coding unit.

7. The method of claim 1, further comprising:
writing the weighted prediction identification information and parameters to the picture code stream.

8. The method of claim 7, wherein the weighted prediction identification information and the parameters are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

9. The method of claim 1, wherein the weighted prediction identification information and the parameters comprise at least one of the following information: reference picture index information, weighted prediction enable control information, region-adaptive weighted prediction enable control information, or weighted prediction parameters.

10. The method of claim 1, wherein the picture code stream comprises a transport stream or a media file.

11. The method of claim 1, wherein said performing weighted predictive coding of the video picture to generate a picture code stream comprises:
performing weighted predictive coding of the video picture according to a pre-trained neural network model.

12. The method of claim 11, wherein the weighted prediction identification information further comprises a neural network model structure and a neural network model parameter.

13. A video decoding method, comprising:
acquiring a picture code stream and parsing weighted prediction identification information and parameters in the picture code stream; and
decoding the picture code stream according to the weighted prediction identification information and parameters to generate a reconstructed picture, wherein, the picture code stream is generated by performing weighted predictive coding of a video picture according to a luminance change situation of the video picture relative to a reference picture, comprising at least one of: in the case where the luminance change situation is the luminance being consistent throughout the entire frame of picture, the picture code stream is generated by performing weighted predictive coding of the video picture; or in the case where the luminance change situation is the luminance being consistent within picture segments, the picture code stream is generated by determining to separately perform weighted predictive coding on each of the picture segments within the video picture.

14. The method of claim 13, wherein the number of the weighted prediction identification information and parameters in the picture code stream is at least one set.

15. The method of claim 13, wherein the weighted prediction identification information and the parameters are contained in at least one of the following parameter sets: a sequence layer parameter set, a picture layer parameter set, a slice layer parameter set, supplemental enhancement information, video availability information, picture header information, slice header information, network abstraction layer unit header information, a coding tree unit, or a coding unit.

16. The method of claim 13, wherein the weighted prediction identification information and the parameters comprise at least one of the following information: reference picture index information, weighted prediction enable control information, region-adaptive weighted prediction enable control information, or weighted prediction parameters;
wherein the picture code stream comprises a transport stream or a media file;
wherein said decoding the picture code stream according to the weighted prediction identification information and parameters to generate a reconstructed picture comprises:
performing weighted predictive decoding of the picture code stream using the weighted prediction identification information and parameters according to a pre-trained neural network model to generate a reconstructed picture;
wherein the weighted prediction identification information and parameters further comprise a neural network model structure and a neural network model parameter.

17. An electronic device, comprising:
at least one processor; and
a memory configured to store at least one program, wherein
the at least one program, when executed by the at least one processor, causes the at least one processor to carry out a video coding method, the method comprising:
acquiring a video picture, wherein the video picture is at least one frame of picture of a video; and
performing weighted predictive coding of the video picture to generate a picture code stream, wherein the weighted predictive coding uses at least one set of weighted prediction identification information and parameters;
wherein said performing weighted predictive coding of the video picture to generate a picture code stream comprises:
performing weighted predictive coding of the video picture according to a luminance change situation of the video picture relative to a reference picture, comprising at least one of:
in the case where the luminance change situation is the luminance being consistent throughout the entire frame of picture, performing weighted predictive coding of the video picture; or
in the case where the luminance change situation is the luminance being consistent within picture segments, determining to separately perform weighted predictive coding on each of the picture segments within the video picture.

* * * * *